United States Patent
Furukawa et al.

(10) Patent No.: US 7,505,110 B2
(45) Date of Patent: Mar. 17, 2009

(54) MICRO-ELECTRO-MECHANICAL VALVES AND PUMPS

(75) Inventors: Toshiharu Furukawa, Essex Junction, VT (US); Mark Charles Hakey, Fairfax, VT (US); Steven John Holmes, Guilderland, NY (US); David Vaclav Horak, Essex Junction, VT (US); Charles William Koburger, III, Delmar, NY (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/276,772

(22) Filed: Mar. 14, 2006

(65) Prior Publication Data

US 2007/0215224 A1    Sep. 20, 2007

(51) Int. Cl.
*F16K 31/02* (2006.01)
(52) U.S. Cl. .................................. 349/833; 251/129.02
(58) Field of Classification Search ................. 137/833, 137/825, 829, 831; 251/129.02, 129.01; 977/725, 733, 732
See application file for complete search history.

(56) References Cited

U.S. PATENT DOCUMENTS

| | | | |
|---|---|---|---|
| 4,581,624 A | 4/1986 | O'Connor | |
| 5,244,537 A | 9/1993 | Ohnstein | |
| 5,380,396 A | 1/1995 | Shikida et al. | |
| 5,529,465 A | 6/1996 | Zengerle et al. | |
| 5,588,466 A * | 12/1996 | Benz et al. ................... | 137/831 |
| 5,901,939 A * | 5/1999 | Cabuz et al. ............ | 251/129.02 |
| 6,000,676 A | 12/1999 | Zengerle et al. | |
| 6,089,534 A | 7/2000 | Biegelsen et al. | |
| 6,168,395 B1 | 1/2001 | Quenzer et al. | |
| 6,182,941 B1 * | 2/2001 | Scheurenbrand et al. ...................... | 251/129.04 |
| 6,237,619 B1 | 5/2001 | Maillefer et al. | |
| 6,240,962 B1 | 6/2001 | Tai et al. | |
| 6,382,588 B1 * | 5/2002 | Hierold ................. | 251/129.04 |
| 6,579,068 B2 | 6/2003 | Bridger et al. | |
| 6,644,944 B2 | 11/2003 | Karp | |
| 6,830,071 B2 | 12/2004 | Xu et al. | |
| 2003/0231967 A1 | 12/2003 | Najafi et al. | |
| 2004/0075073 A1 | 4/2004 | Claydon et al. | |
| 2004/0108479 A1 | 6/2004 | Garnier et al. | |
| 2004/0113980 A1 * | 6/2004 | Lewis et al. .................... | 347/54 |
| 2005/0139797 A1 * | 6/2005 | Wang et al. ............ | 251/129.01 |

OTHER PUBLICATIONS

Zengerle, et al.; A Micro Membrane Pump With Electrostatic Actuation; Micro Electro Mechanical Systems '92; 0-7803-0497-7/92; 1992 IEEE; pp. 19-24.

Judy, et al.; Surface-Machined Micromechanical Membrane Pump; CH2957-9/91/0000-0182; 1991 IEEE; pp. 182-186.

(Continued)

*Primary Examiner*—John Rivell
*Assistant Examiner*—Cloud K Lee
(74) *Attorney, Agent, or Firm*—Schmeiser, Olsen & Watts; William D. Sabo

(57) ABSTRACT

Methods of fabricating micro-valves and micro-pumps. The micro-valves and micro-pumps that are fabricated include electrically conductive diaphragms fabricated from electrically conductive nano-fibers. Fluid flow through the micro-valves and pumping action of the micro-pumps is accomplished by applying electrostatic forces to the electrically conductive diaphragms.

14 Claims, 22 Drawing Sheets

OTHER PUBLICATIONS

Pang, et al.; The Study of Single-Chip Integrated Microfluidic System; 0-7803-4306-9/98; 1998 IEEE; pp. 895-898.

Dubois, et al.; Electrostatically Actuated Gas Microvalve Based on A Ta-Si-N Membrane; 0-7803-5998-4/01; 2001 IEEE; pp. 535-538.

* cited by examiner

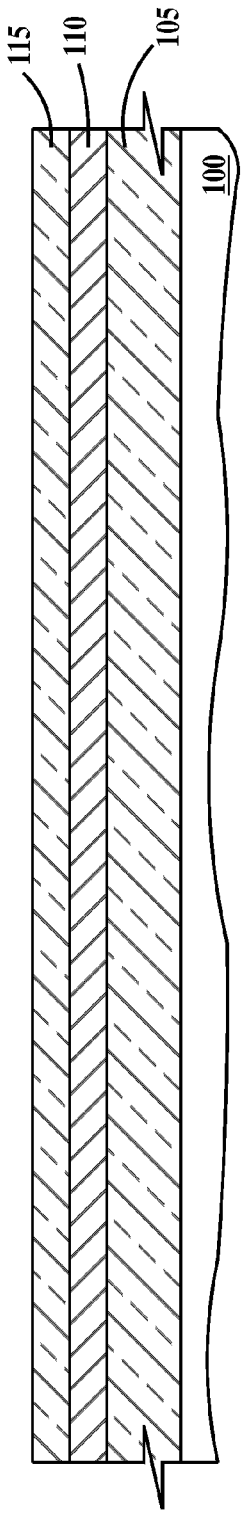
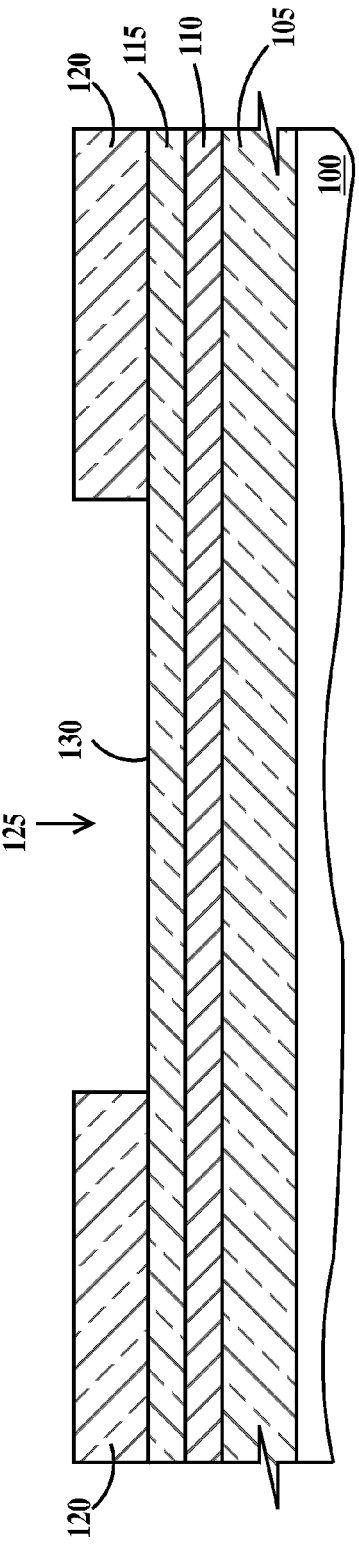
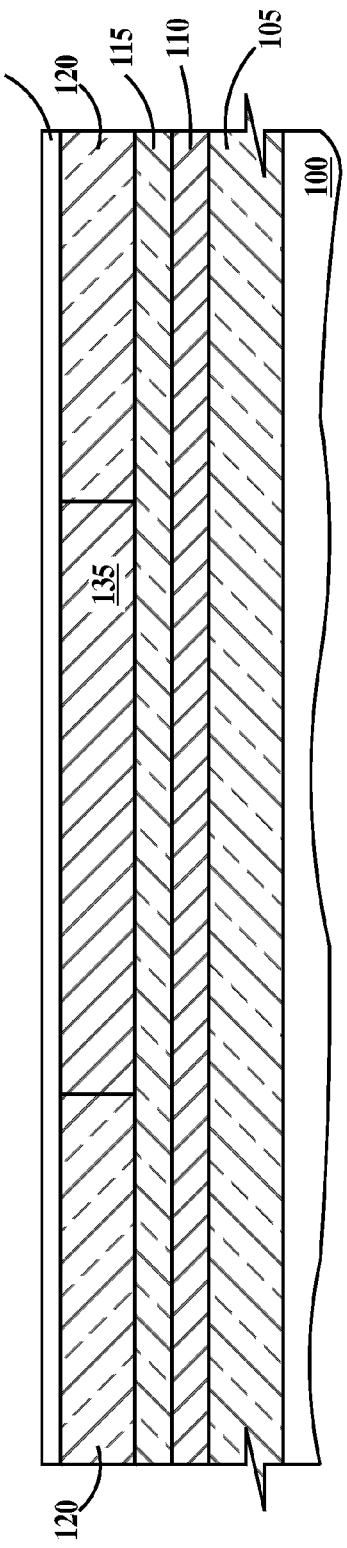

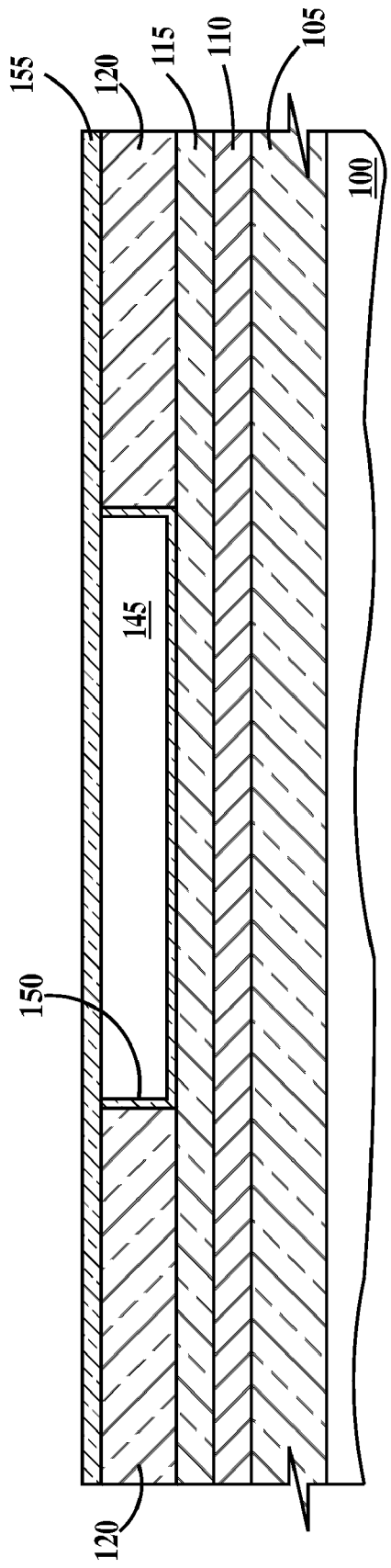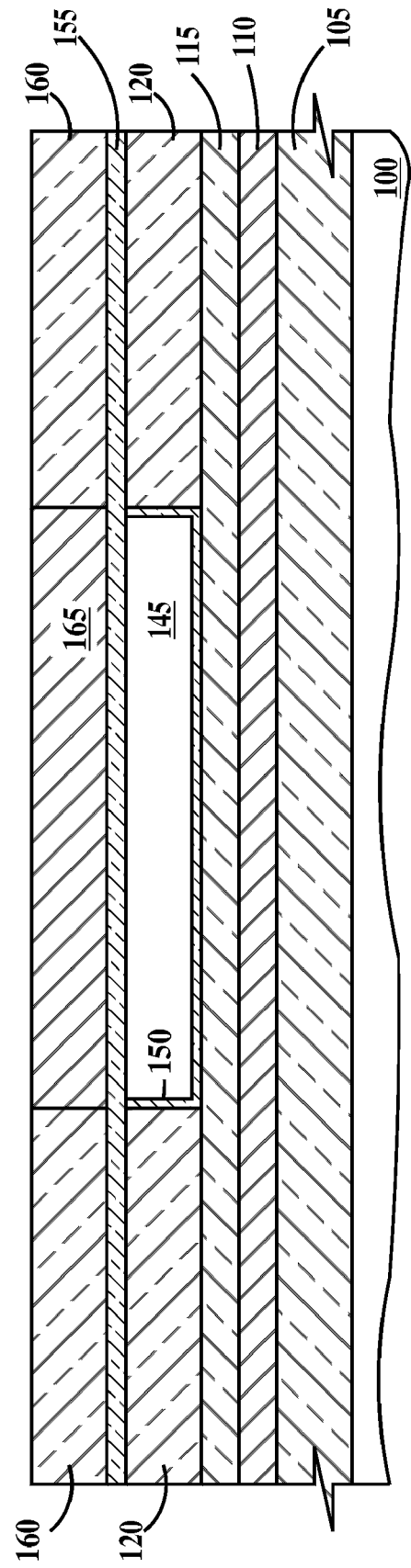

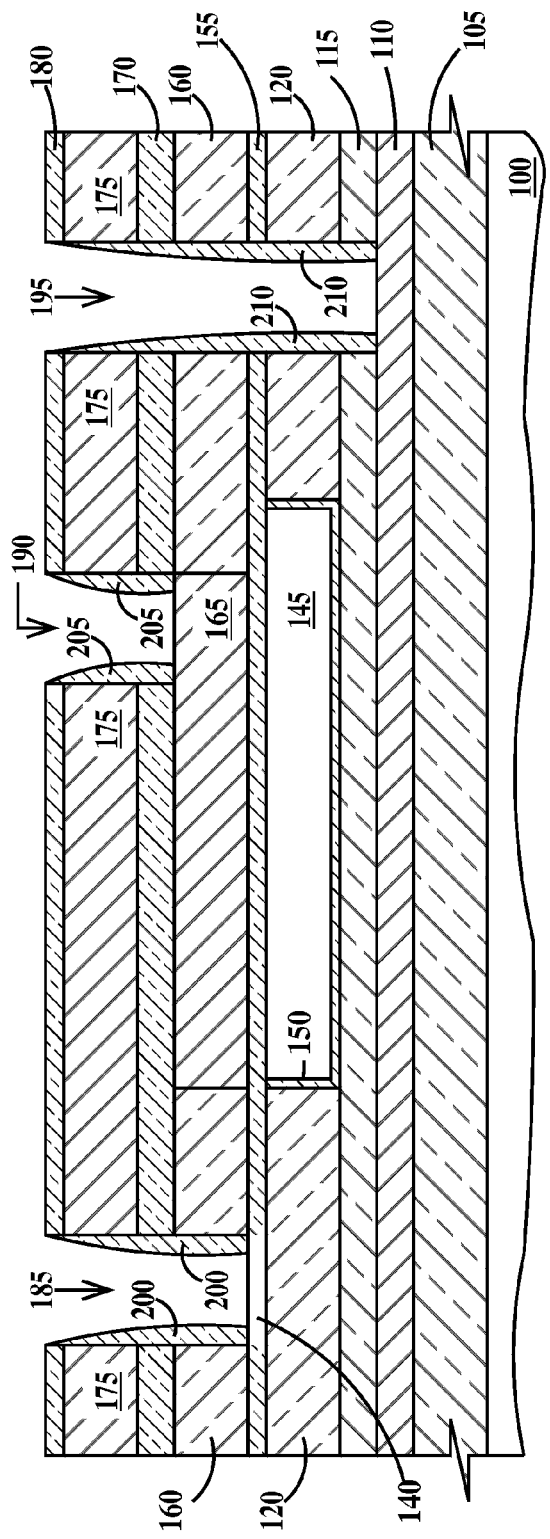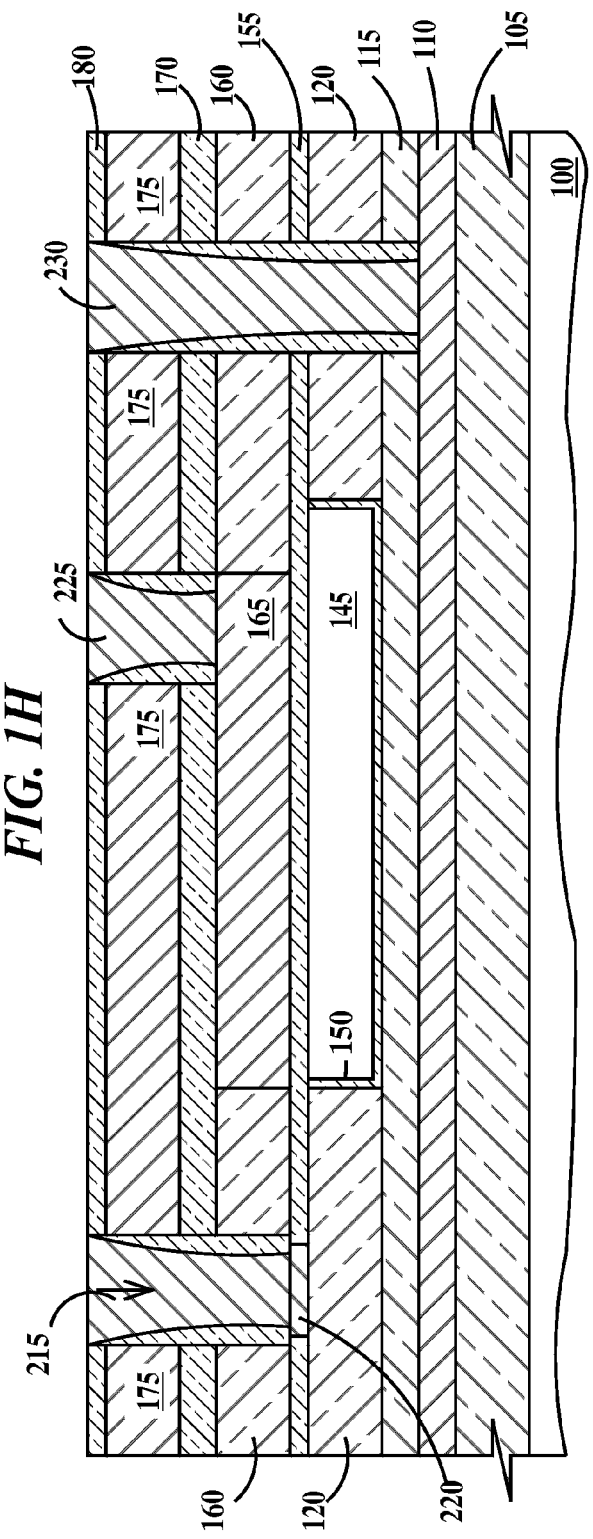

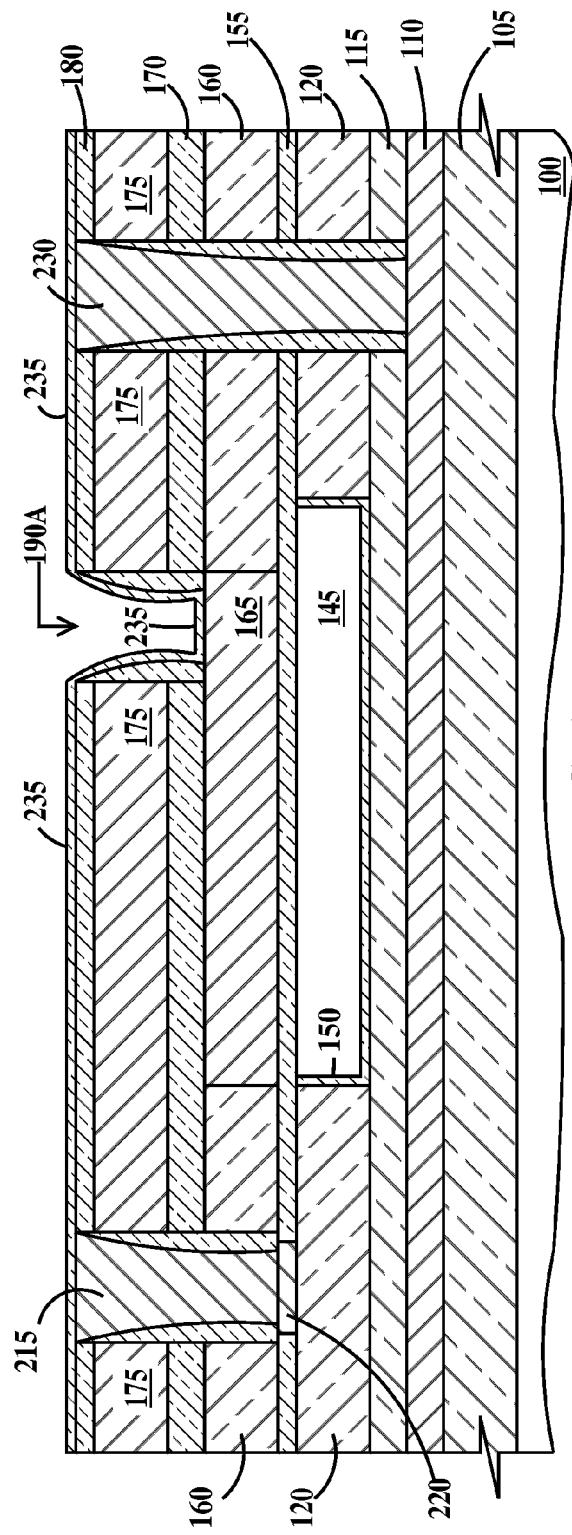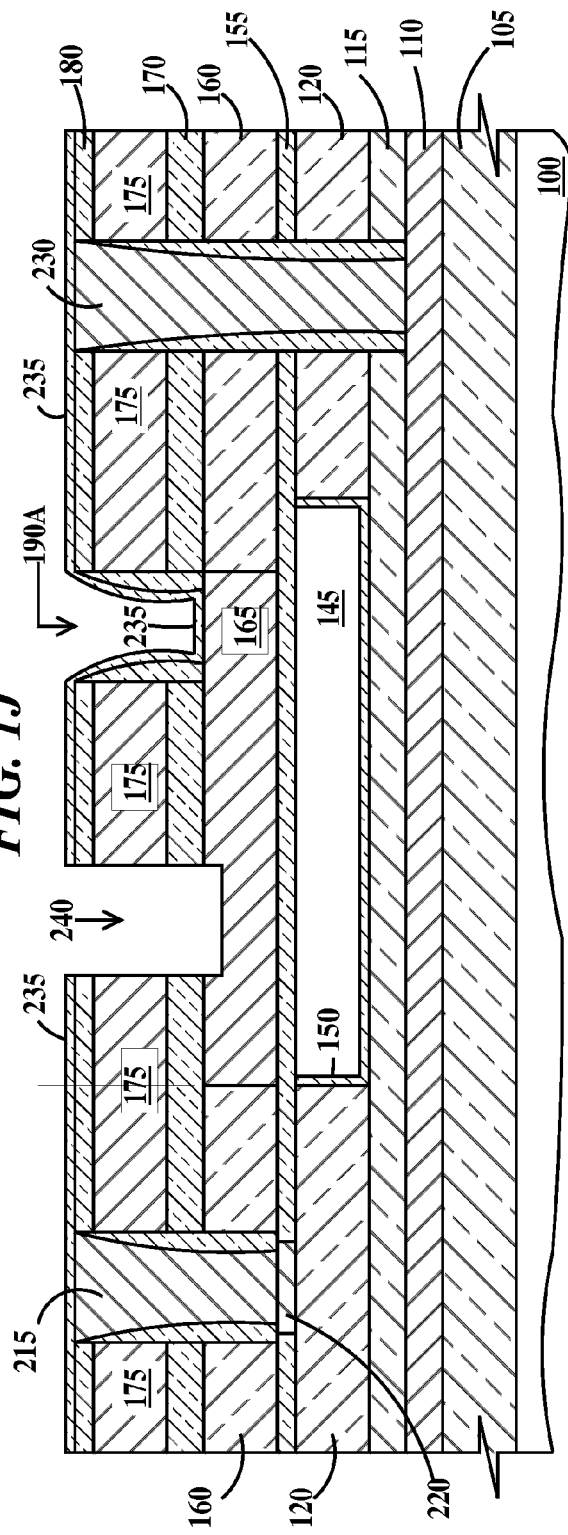

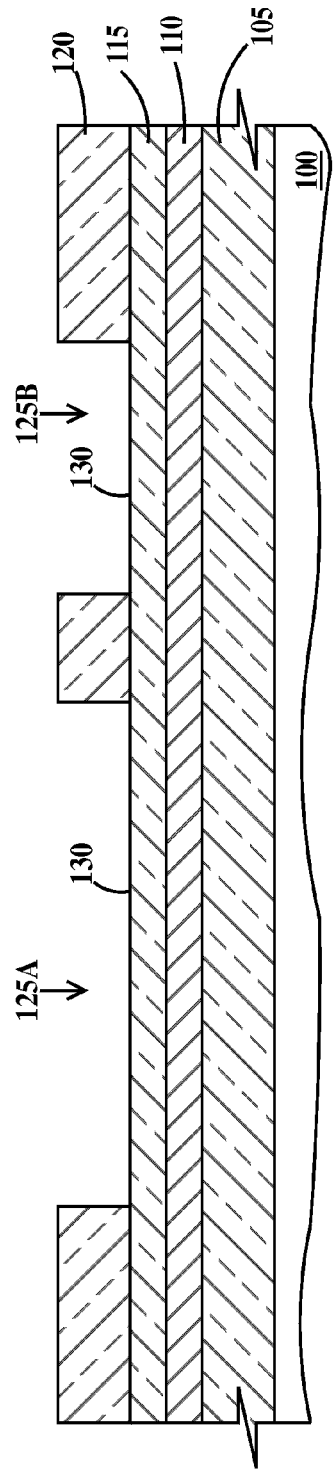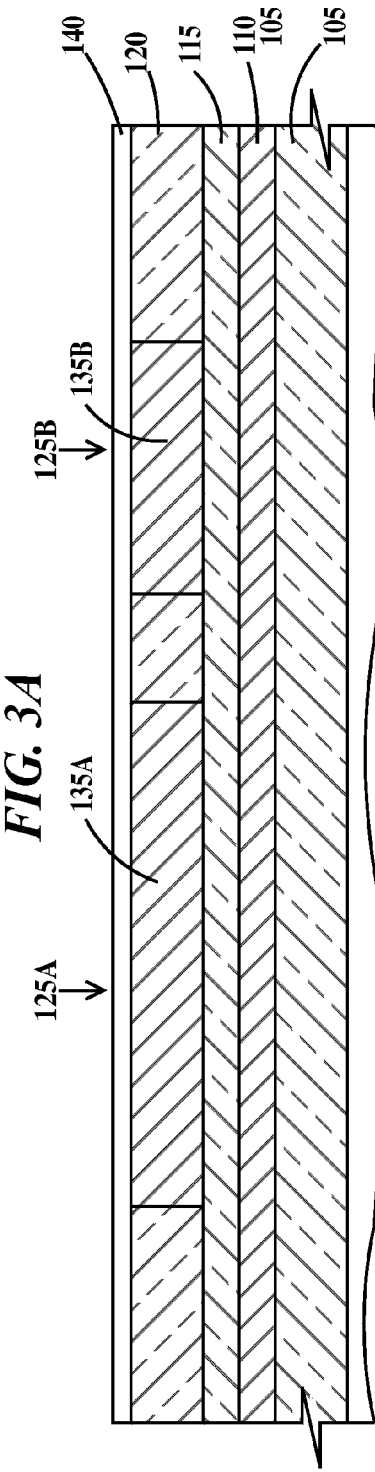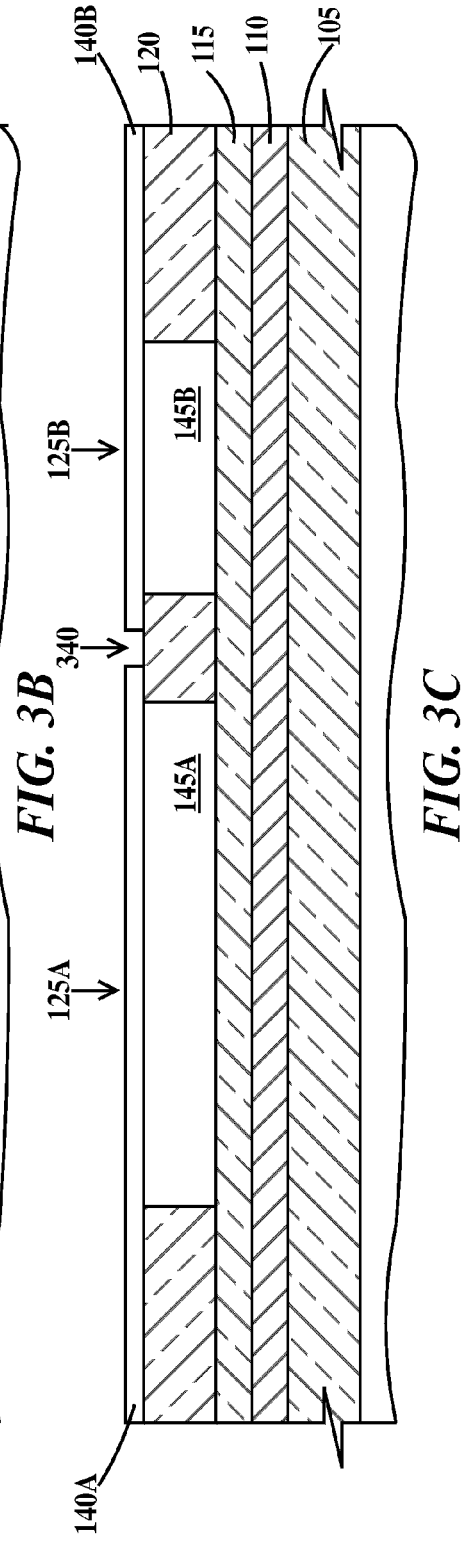

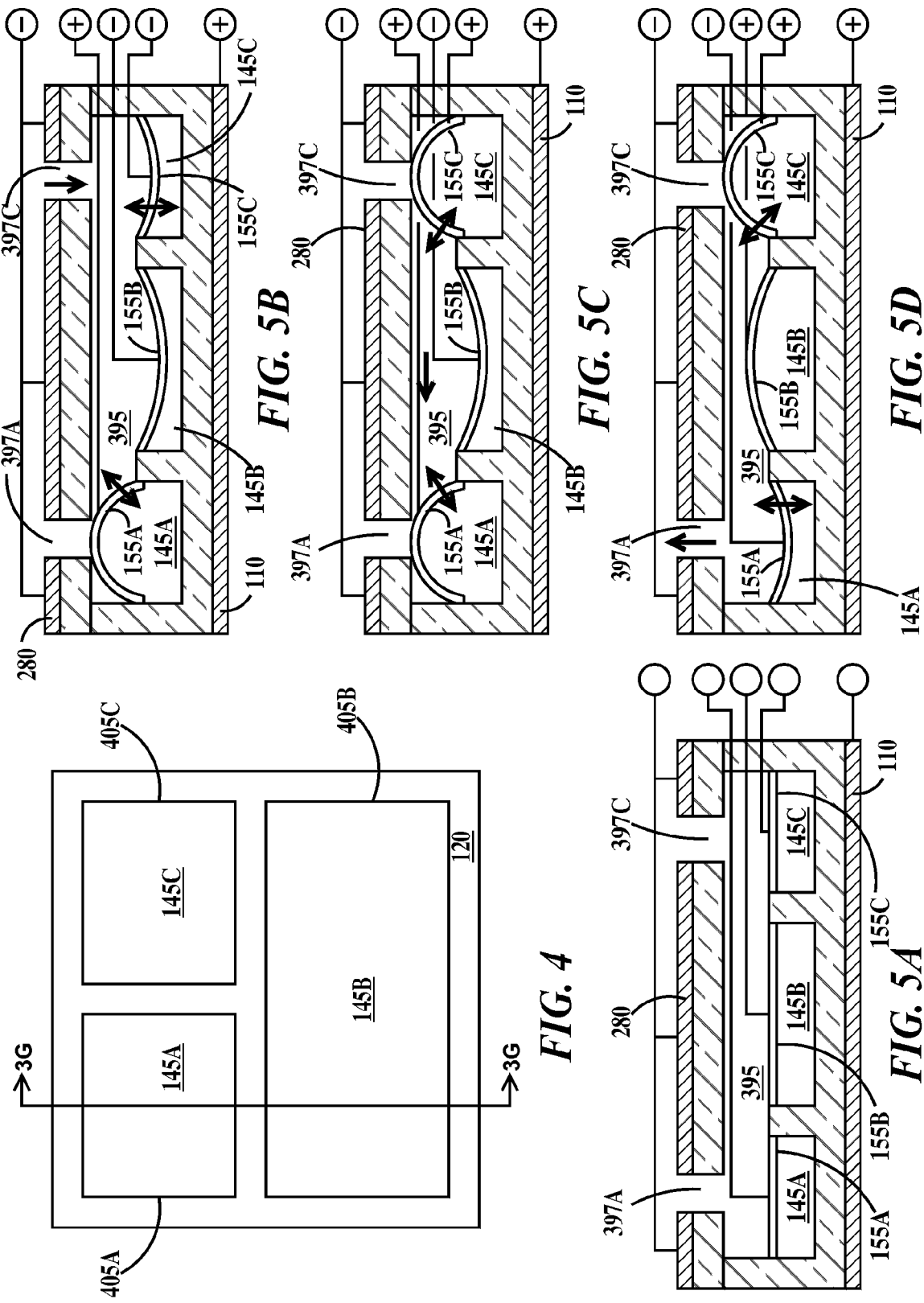

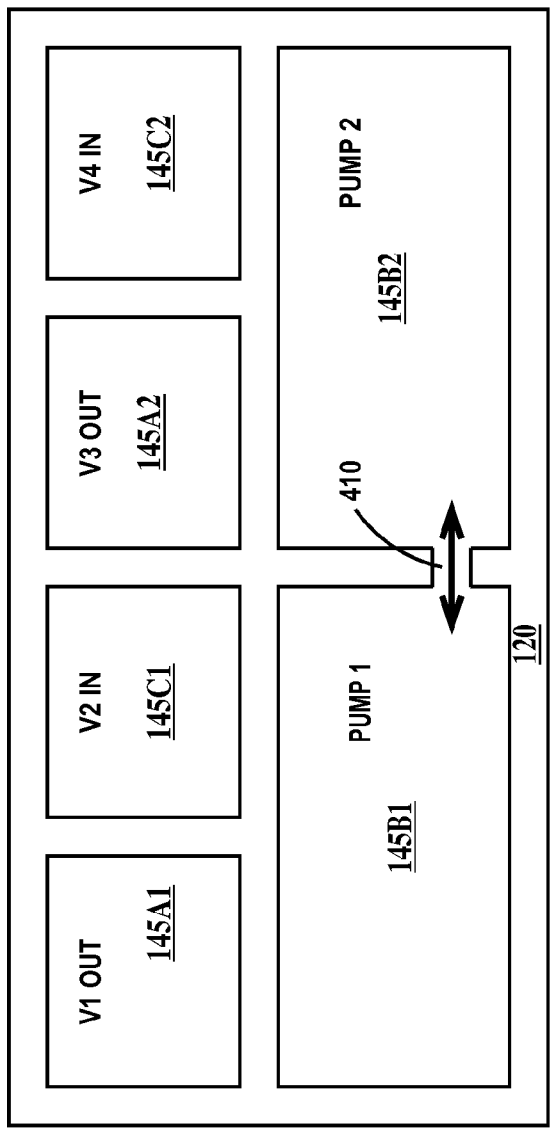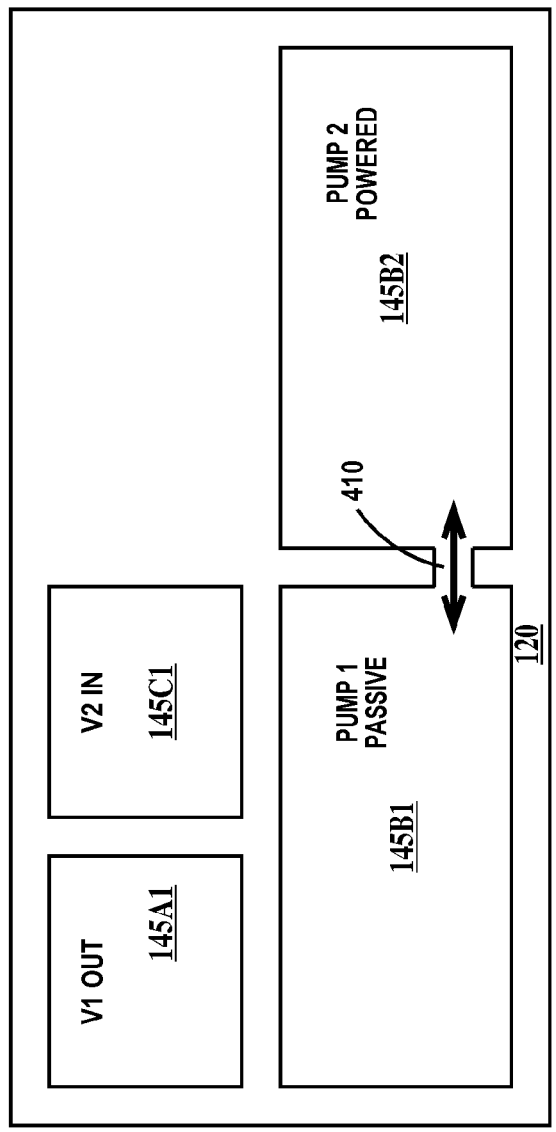

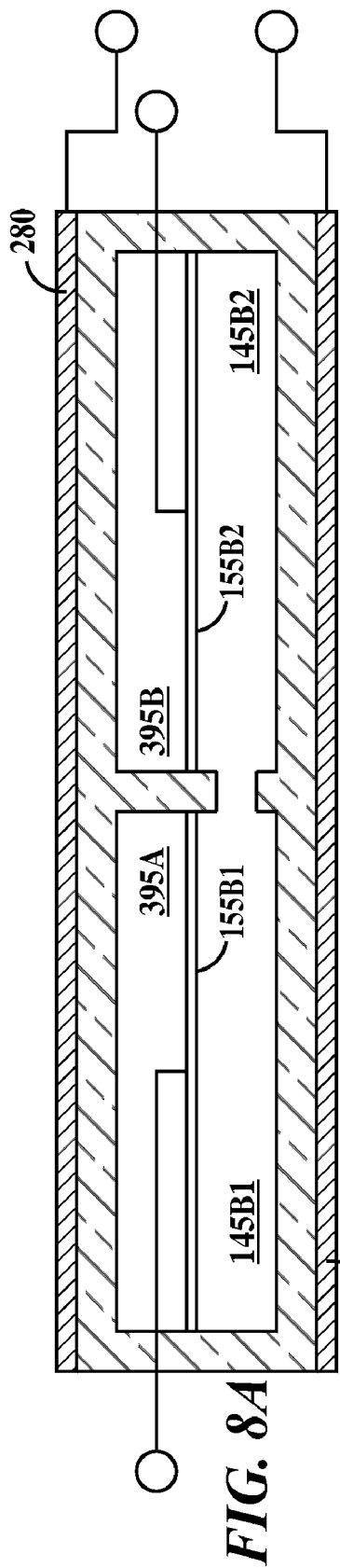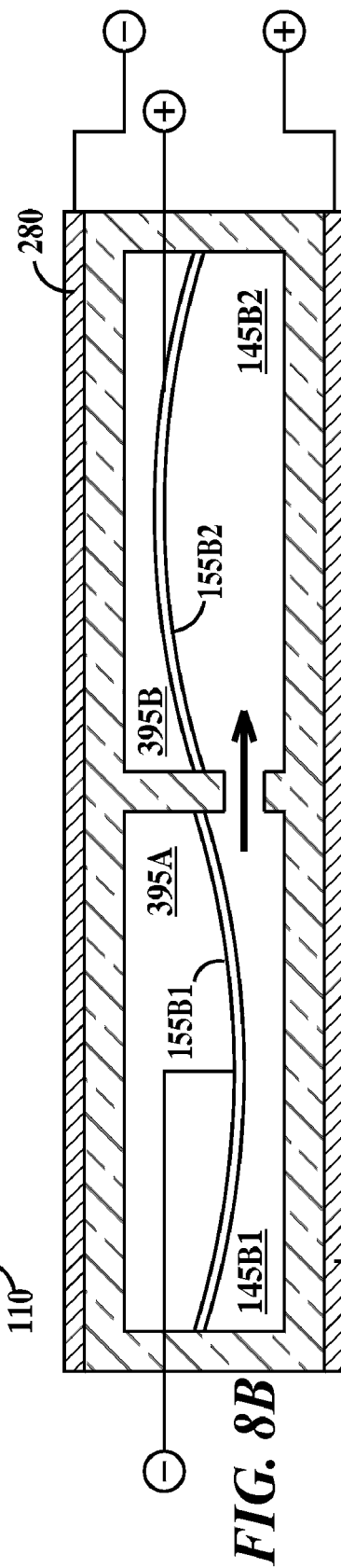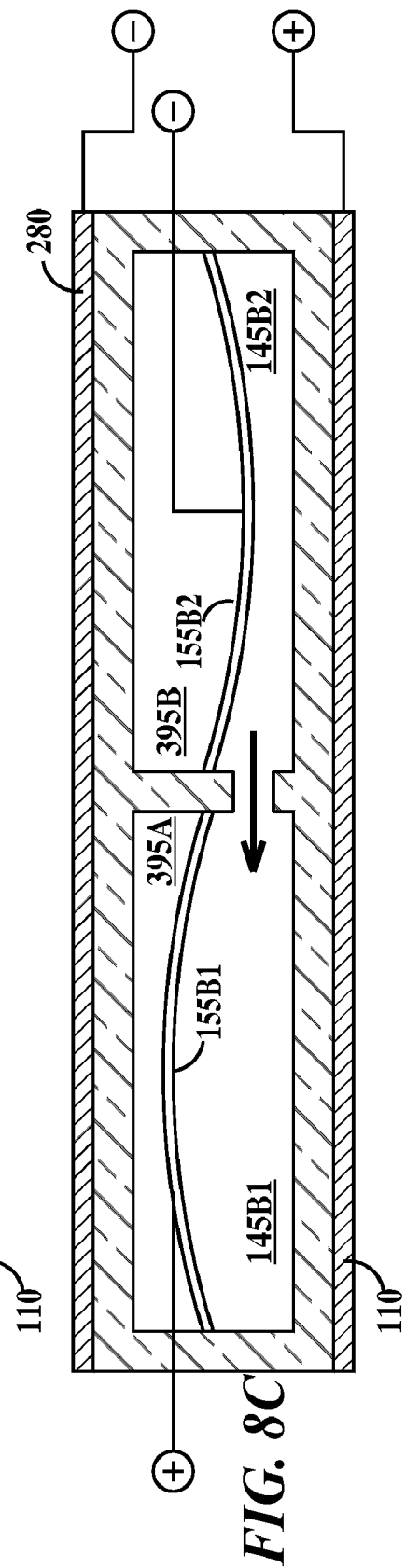

MICRO-ELECTRO-MECHANICAL VALVES AND PUMPS

FIELD OF THE INVENTION

The present invention relates to the field of micro-electro-mechanical valves and pumps; more specifically, it relates to micro-electro-mechanical valves and pumps having carbon nanotube diaphragms and methods of fabricating micro-electro-mechanical valves and pumps having conductive nano-fiber diaphragms.

BACKGROUND OF THE INVENTION

In recent years, a need has developed for micro-fluidic devices capable of delivering extremely small quantities of fluids very precisely. Examples of potential uses of such devices include micro-fuel cells, micro-chemical analysis and delivery of micro-doses of medications. Therefore, there is an ongoing need for micro-electro-mechanical valves and pumps.

SUMMARY OF THE INVENTION

A first aspect of the present invention is a micro-valve having an inlet and an outlet, the micro-valve comprising: a lower chamber having a bottom wall and sidewalls and an upper chamber having a top wall and sidewalls, a bottom of the upper chamber separated from a top of the lower chamber by a porous, flexible and electrically conductive mat of nano-fibers; an opening in the top wall of the upper chamber; an impervious valve seal on the mat of nano-fibers, the valve seal below and self-aligned to the first opening; an electrically conductive plate under the bottom wall of the lower chamber; a first electrical contact to the conductive plate; and a second electrical contact to the mat of nano-fibers.

A second aspect of the present invention is the first aspect wherein the outlet is comprised of the opening in the top wall of the upper chamber and the inlet is comprised of an additional opening in the top wall of the upper chamber.

A third aspect of the present invention is the second aspect, wherein the micro-valve is a normally-open valve.

A fourth aspect of the present invention is the first aspect, further including: a valve seat defined by an edge of the opening along an interior surface of the upper wall of the upper chamber.

A fifth aspect of the present invention is the first aspect, further including a valve seat formed on sidewalls of the opening.

A sixth aspect of the present invention is the first aspect, wherein a region of the top wall of the upper chamber adjacent to the opening is thicker than a region of the top wall of the upper chamber away from the opening.

A seventh aspect of the present invention is the sixth aspect, wherein the outlet is comprised of the opening in the top wall of the upper chamber and the inlet is comprised of an additional opening in the top wall of the upper chamber.

An eighth aspect of the present invention is the seventh aspect, wherein the micro-valve is a normally-closed valve.

A ninth aspect of the present invention is the sixth aspect, further including: a valve seat defined by an edge of the opening along an interior surface of the upper wall of the upper chamber.

A tenth aspect of the present invention is the first aspect, further including: an additional conductive plate on top of the upper chamber; a third electrical contact to the additional conductive plate; and an additional opening into the bottom chamber, the inlet comprised of the additional opening and the outlet comprised of the opening.

A eleventh aspect of the present invention is the tenth aspect, wherein the micro-valve is a normally-open valve.

A twelfth aspect of the present invention is the first aspect, further including a protective coating on nano-fibers of the mat of nano-fibers.

A thirteen aspect of the present invention is the first aspect, wherein the valve seal is pushed against or pulled away from the opening in response to electrostatic forces applied to the mat of nano-fibers.

A fourteenth aspect of the present invention is the first aspect, wherein the micro-fibers are silicon filaments or carbon nanotubes.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIGS. 3A through 3G 2G are cross-sectional drawings illustrating fabrication of a micro-pump according to a third embodiment of the present invention;

FIG. 4 is a top view of the valve and pump chambers of the micro-pump according to the third embodiment of the present invention;

FIGS. 5A through 5D are schematic drawings illustrating operation of the micro-pump according to the third embodiment of the present invention;

FIG. 6 is a top view of the valve and pump chambers of a micro-pump according to a fourth embodiment of the present invention;

FIG. 7 is a top view of the valve and pump chambers of a micro-pump according to a fifth embodiment of the present invention; and FIGS. 8A through 8C are schematic drawings illustrating operation of the micro-pump according to the fourth embodiment of the present invention.

DETAILED DESCRIPTION OF THE INVENTION

The term normally-open when applied to an electrostatically operated valve as described herein is defined a valve that allows fluid to flow from an inlet of the valve to an outlet of the valve when no power or voltage potentials are applied to the valve.

The term normally-closed when applied to an electrostatically operated valve as described herein is defined a valve that blocks fluid from flowing from an inlet of the valve to an outlet of the valve when no power or voltage potentials are applied to the valve.

The terms impervious and non-porous may be used interchangeably and are relative to either the fluid being controlled by a micro-pump or pumped by a micro-pump. The terms pervious and porous may be used interchangeably relative to either the fluid being controlled by a micro-pump or pumped by a micro-pump. The terms insulating and dielectric may be used interchangeably.

The term nano-fiber is defined as a thread, filament or tube having a diameter or cross-sectional area in a direction perpendicular to a longitudinal axis of the thread, fiber or tube no of less than one micron. Examples of nano-fibers includes but are not limited to silicon filaments and carbon nanotubes (CNTs). The nano-fibers of embodiments of the present invention are electrically conductive.

The embodiments of the present invention will be illustrated using CNTs and CNT mats. It should be remembered that other types of conductive-nano-fibers and mats may be substituted for CNTs and CNT mats. The nano-fiber mats described herein may be considered diaphragms.

Figure 1F:
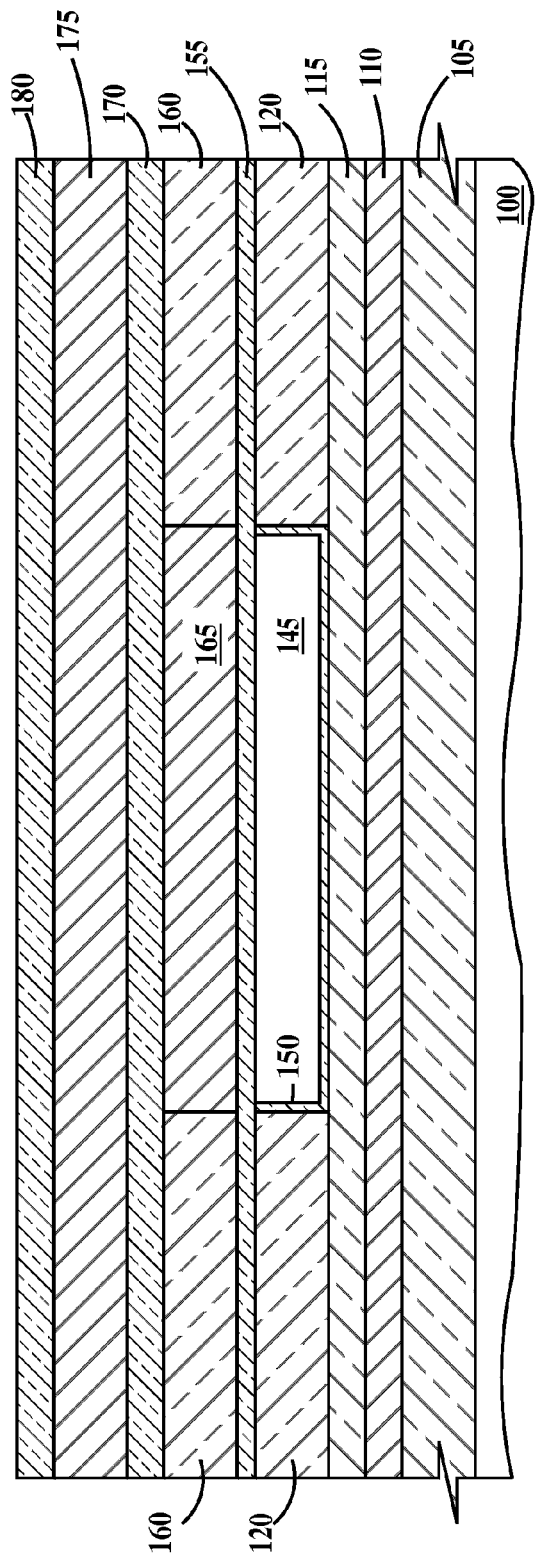
FIGS. 1A through 1N are cross-sectional drawings illustrating fabrication of a normally-open valve and a normally-closed micro-valve according to a first embodiment of the present invention.
FIGS. 1O and 1P are cross-sectional drawings illustrating operation of the normally-closed micro-valve according to the first embodiment of the present invention.
Figure 1G:
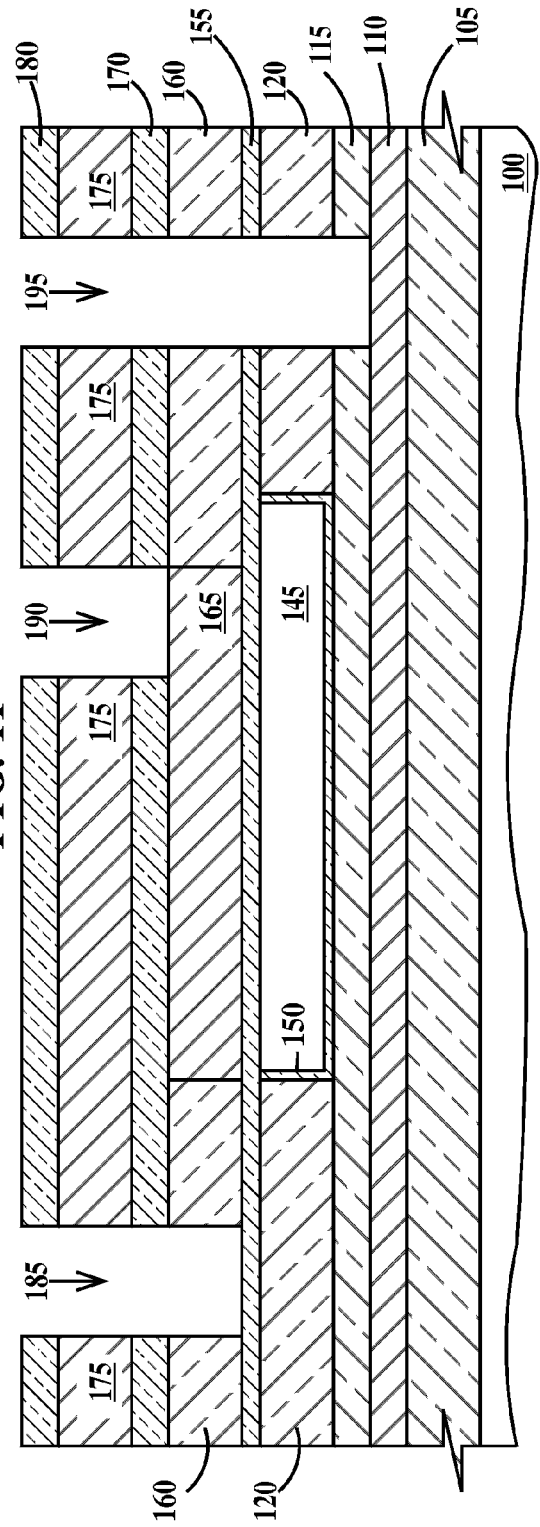
Figure 1L:
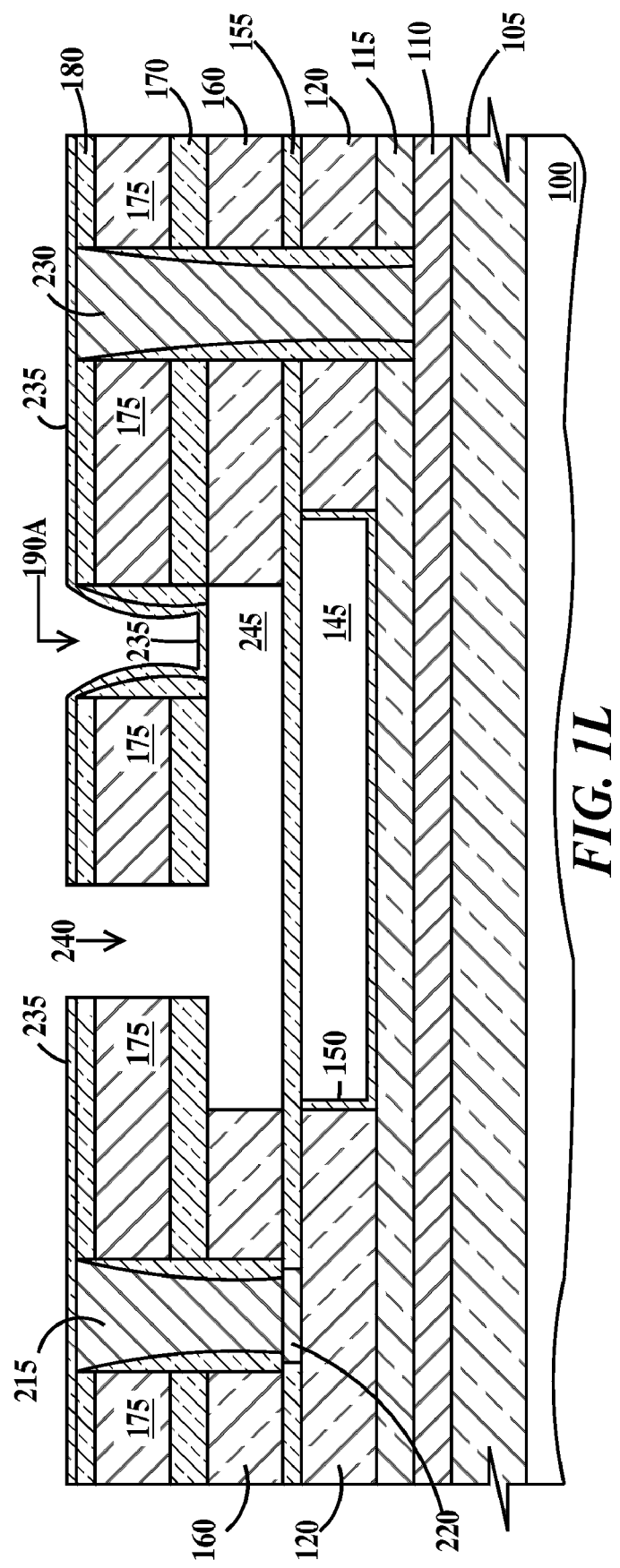
Figure 1M:
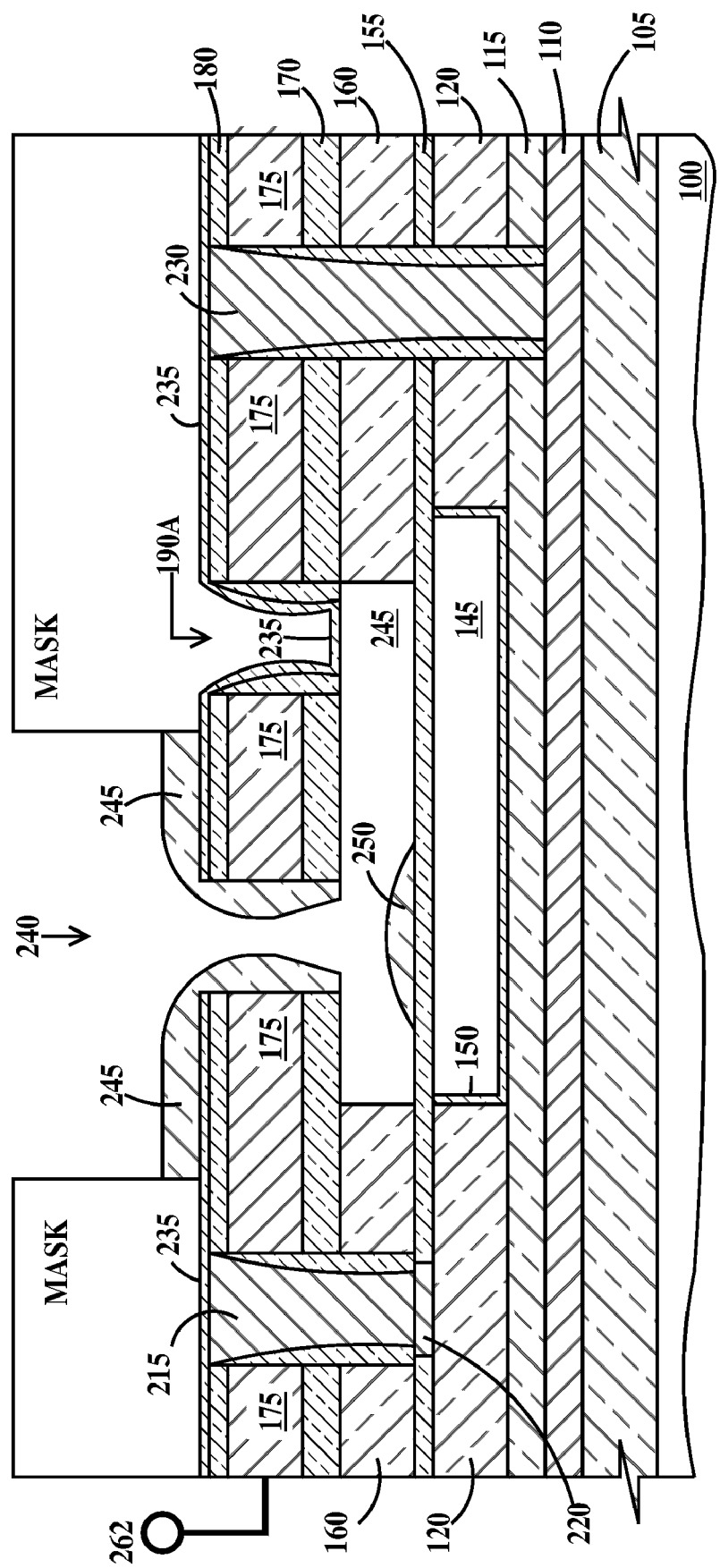
Figure 1N:
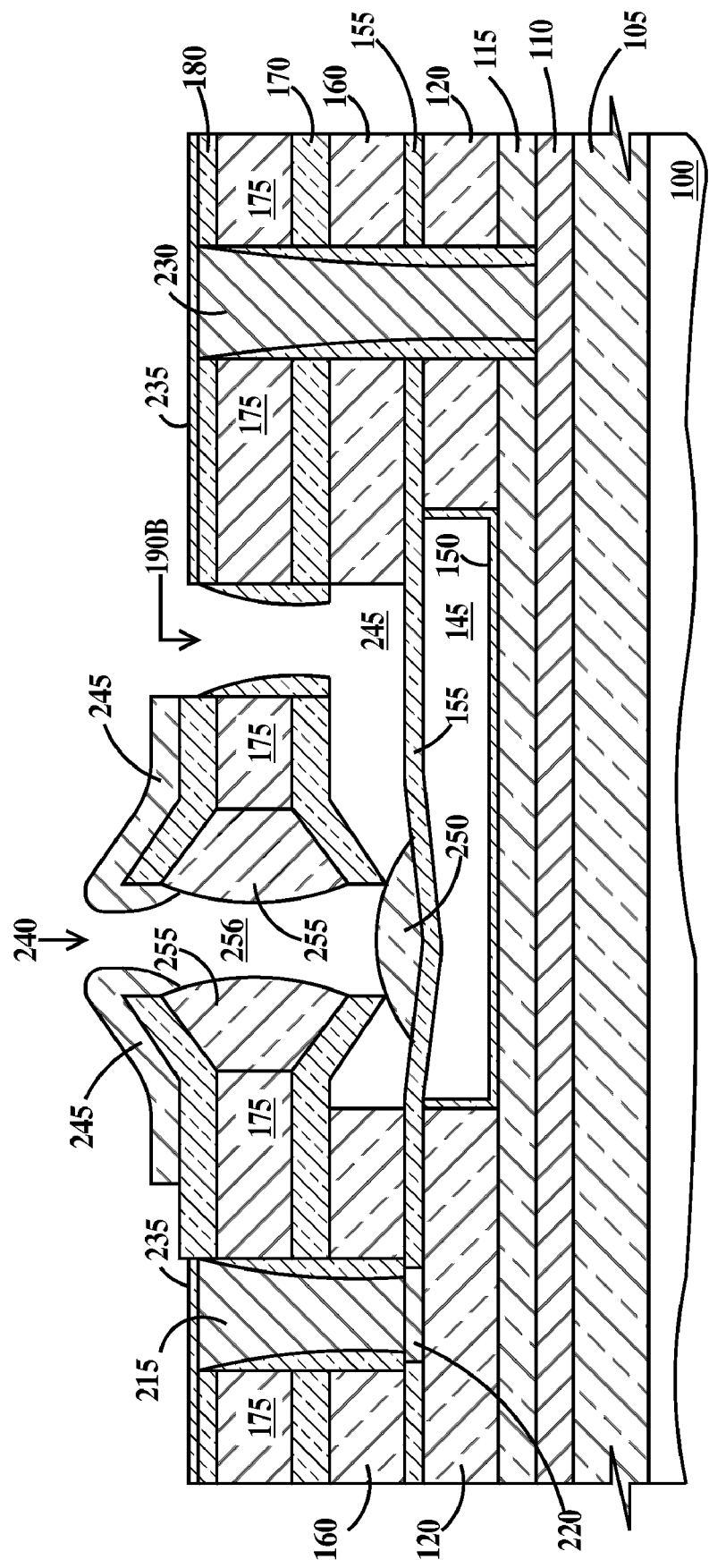
Figure 10:
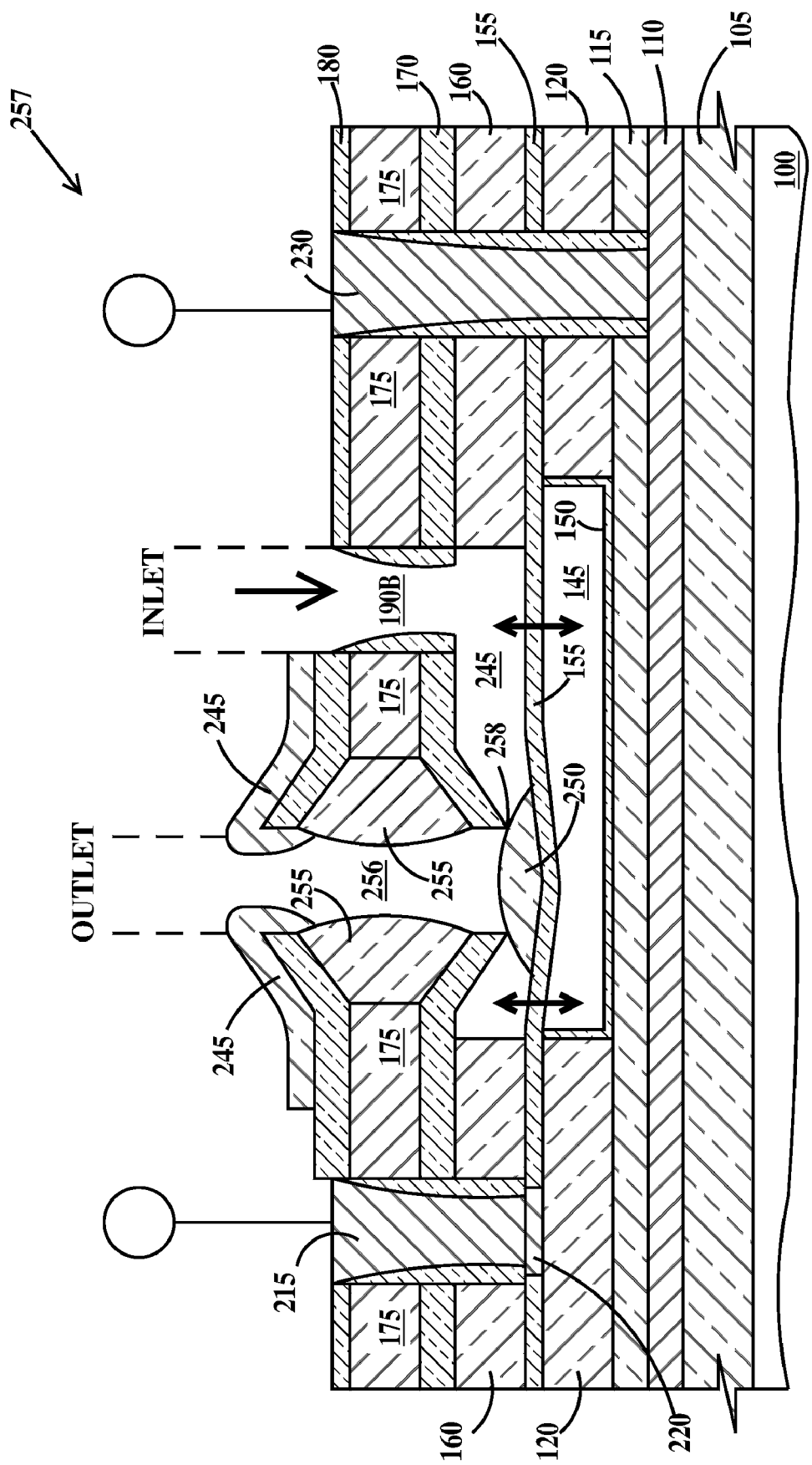

FIGS. 1A through 1N are cross-sectional drawings illustrating fabrication of a normally-open valve (FIGS. 1A through 1M) and a normally-closed micro-valve (FIGS. 1A through 1N) according to a first embodiment of the present invention. In FIG. 1A, formed on a substrate 100 is an insulating layer 105. Formed on insulating layer 105 is an electrically conductive layer 110. Formed on conductive layer 110 is an insulating layer 115. In one example, substrate 100 comprises silicon or quartz. In one example, insulating layers 105 and 115 independently comprise silicon dioxide, silicon nitride, quartz or polyimide. In one example, conductive layer 110 comprises copper, aluminum, aluminum-copper alloy, tungsten, tantalum, titanium, titanium nitride, tantalum nitride or combinations thereof.

In FIG. 1B, an insulating layer 120 is formed on insulating layer 115 and a trench 125 is formed in insulating layer 120, exposing a top surface 130 of insulating layer 115 in the bottom of the trench. In one example, insulating layer 120 comprises silicon dioxide, silicon nitride, quartz or polyimide. In one example, trench 125 may be formed by a photolithographic process to create a mask followed by a reactive ion etch (RIE) to remove unwanted portions of insulating layer 120 not protected by the mask followed by removal of the mask.

In FIG. 1C, trench 125 is over-filled with a sacrificial material and a chemical-mechanical-polish (CMP) performed so that a top surface of a sacrificial fill 135 and a top surface of insulating layer 120 are coplanar. Then a flexible carbon nanotube (CNT) mat 140 formed over sacrificial fill 135. CNT mat 140 overlaps onto insulating layer 120. In one example, sacrificial fill 135 comprises germanium formed by low pressure chemical vapor deposition (LPCVD) or plasma enhanced chemical vapor deposition (PECVD). CNT mat 140 is comprised of layers of CNTs and is porous. In one example, CNT mat 140 is formed by spin application of a suspension of CNTs in a volatile liquid. CNT mat 140 may comprise multiple layers of CNT mats. CNT mat materials may be fabricated by any number of methods known in the art or may be purchased commercially. One method of CNT preparation is described in United States Patent Publication US 2002/0090330 to Smalley et al., filed on Dec. 28, 2001, which is hereby incorporated by reference in its entity.

In FIG. 1D, sacrificial fill 135 (see FIG. 1C) is removed to create a chamber 145. If sacrificial fill 135 is germanium, the sacrificial fill may be removed by etching with a solution of hydrogen peroxide. Next, an optional protective coating is applied to CNT mat 140 (see FIG. 1C) to produce a flexible coated CNT mat 155. Suitable coating materials include dielectrics, metals and polymers that may be applied, for example, by sputter deposition, PECVD or atomic layer deposition (ALD). In one example, the coating material is silicon nitride applied to form a 50 Å thick layer over individual CNTs. Coated CNT mat 155 is porous, the coating material not filling all the voids in the mat. A thin layer 150 of coating material may be formed on the bottom and sidewalls of chamber 145.

In FIG. 1E, an insulating layer 160 is formed on coated CNT mat 155, a trench is formed in insulating layer 160 and over-filled with a sacrificial fill 165. A chemical-mechanical-polish (CMP) performed so that a top surface of sacrificial fill 165 and a top surface of insulating layer 160 are coplanar. In one example, insulating layer 160 comprises silicon dioxide, silicon nitride, quartz or polyimide. In one example, sacrificial fill 165 comprises germanium formed by low pressure chemical vapor deposition (LPCVD) or plasma enhanced chemical vapor deposition (PECVD).

In FIG. 1F, a first dielectric layer 170 is formed on insulating layer 160 and sacrificial fill 165. Next, an electrically conductive layer 175 is formed on first dielectric layer 170. Then a second dielectric layer 180 is formed on conductive layer 175. In one example, first and second dielectric layers 170 and 180 are silicon nitride and conductive layer 175 is polysilicon.

In FIG. 1G, trenches 185, 190 and 195 are formed. Trench 185 extends though second dielectric layer 180, conductive layer 175, first dielectric layer 170 and insulating layer 160. Coated CNT mat 155 is exposed in the bottom of trench 185. Trench 190 extends though second dielectric layer 180, conductive layer 175 and first dielectric layer 170. Sacrificial fill 165 is exposed in the bottom of trench 190. Trench 195 extends though second dielectric layer 180, conductive layer 175, first dielectric layer 170, insulating layer 160, coated CNT mat 155, insulating layer 120 and insulating layer 115. Conductive layer 110 is exposed in the bottom of trench 195. In one example, trenches 185 and 190 are formed and protected (for example by a layer of photoresist) and trench 195 then formed. In one example, trenches 185, and 190 and a portion of trench 195 to coated CNT mat 155 are formed and protected (for example by a layer of photoresist) and the remainder of trench 195 is formed. Formation of trenches 185, 190 and 195 may be accomplished by photolithographic processes followed by RIE and removal of photoresist layers. Silicon nitride and silicon dioxide may be etched using a fluorine-based RIE. CNTs may be etched using an oxygen-based RIE (after removal of the silicon nitride coating).

In FIG. 1H, silicon nitride spacers 200 are formed on the sidewalls of trench 185, silicon nitride spacers 205 are formed on the sidewalls of trench 190 and silicon nitride spacers 210 are formed on the sidewalls of trench 195. Spacers are formed by deposition of a conformal layer followed by RIE to remove the conformal coating from horizontal surfaces (e.g. second dielectric layer 180 and the bottoms of trenches 185, 190 and 195) while leaving the conformal coating on vertical surfaces (e.g. the sidewalls of trenches 185, 190 and 195). The spacer RIE process (or another RIE process) removes the coating from coated CNT mat 155, leaving carbon nanotubes 220 exposed in the bottom of trench 185. If the coating of coated CNT mat 155 is electrically conductive (for example, a metal) then the coating need not be removed.

In FIG. 1I, a damascene process is performed to form electrically conductive contacts 215, 225 and 230. Contact 215 electrically contacts coated CNT mat 155 through exposed carbon nanotubes 220, contact 225 electrically contacts sacrificial fill 165 and contact 230 electrically contacts conductive layer 110. A damascene process is one in which trenches are formed in a dielectric layer, an electrical conductor of sufficient thickness to fill the trenches is deposited on a top surface of the dielectric, and a chemical-mechanical-polish (CMP) process is performed to remove excess conductor and make the surface of the conductor co-planer with the surface of the dielectric layer to form a damascene contact (or via or wire). In one example, contacts 215, 225 and 230 each comprise copper, aluminum, aluminum-copper alloy, tungsten, tantalum, titanium, titanium nitride, tantalum nitride or combinations thereof.

In FIG. 1J, contact 225 (see FIG. 1I) is removed and a thin conformal silicon nitride layer 235 formed. Silicon nitride layer 235 covers and protects sacrificial fill 165 in the bottom of an opening 190A.

In FIG. 1K, an opening 240 is formed over sacrificial fill 165. Opening 240 extends though second dielectric layer 180, conductive layer 175 and first dielectric layer 170. Sacrificial fill 165 is exposed in the bottom of trench 190A.

In FIG. 1L, sacrificial fill 165 (see FIG. 1K) is removed to form a chamber 245 over chamber 145. Chamber 145 and 245 are separated by porous coated CNT mat 155. If sacrificial fill 165 (see FIG. 1K) is germanium, the sacrificial fill may be removed by etching with a solution of hydrogen peroxide In FIG. 1M, an impervious valve seat 245 and impervious valve seal 250 are simultaneously formed on the sidewalls of opening 240 and on a portion of coated CNT mat 155 directly under opening 240. Since valve seal 250 is formed through opening 240, valve seal 250 is self-aligned to opening 240 and valve seat 245. Suitable materials for valve seat 245 and valve seal 250 include dielectric, metal and polymers that may be applied, for example, by sputter deposition or PECVD using mask (as illustrated) which is then removed. By removal of silicon nitride layer 235 in opening 190A, a fully functional normally-open (NO) valve may be obtained.

It should be appreciated that if a NO valve is desired, only first dielectric layer 170 is required and conductive layer 175 and second dielectric layer 180 may be eliminated. Alternatively, first dielectric layer 170, conductive layer 175 and second dielectric layer 180 may be replaced by a layer of dielectric material.

For a normally-closed (NC) valve, the valve seat 245 and valve seal 250 material needs to withstand the about 700° C. to about 800° C. temperature of the process described infra in reference to FIG. 1N without adverse effects.

In FIG. 1N, a thermal oxidation (in one example in steam or oxygen between about 700° C. and about 800° C.) is performed to oxidize regions of conductive layer 175 adjacent to opening 240 (see FIG. 1M) to form silicon oxide regions 255 and an outlet 256. The protective coating applied to coated CNT mat 155 protects the CNTs of the coated CNT mat from being oxidized by the thermal oxidation. Because there is about a 40% to about a 60% increase in volume when silicon is oxidized, second dielectric layer 180 is forced upward and first dielectric layer 170 is forced downward to contact valve seal 250. Removal of silicon nitride layer 235 (see FIG. 1M) forms an inlet 190B and completes fabrication of a NC valve according to the first embodiment of the present invention.

Figure 1P:
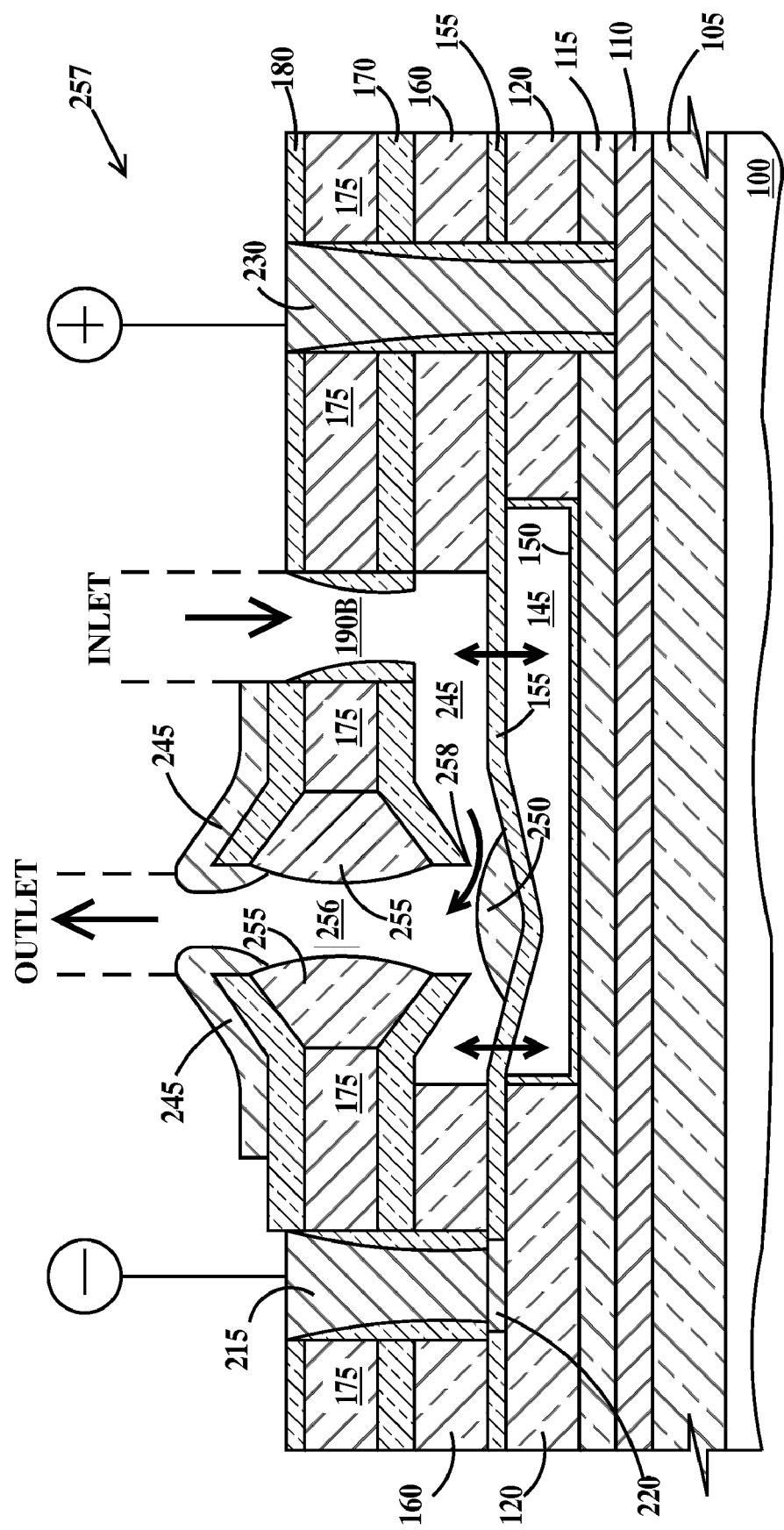

FIGS. 1O and 1P are cross-sectional drawings illustrating operation of the normally-closed micro-valve according to the first embodiment of the present invention. In FIG. 1O, a NC valve 257 is shown in the closed position. There is no fluid transfer between inlet 190B and outlet 256. In FIG. 1P, with no voltage potentials (or the same polarity voltage potential) applied to contacts 215 and 230 valve seal 250 is pressed against the edge 258 of silicon-nitride layer 170 along the periphery of outlet 240A due to the normal resiliency of coated CNT mat 155. Edge 258 is the valve seat of NC valve 257. Because coated CNT mat 155 is porous, fluid from chamber 245 can pass into chamber 145 and fluid in chamber 145 can pass into chamber 245. The pressure of the fluid on the inlet side of valve 257 helps to keep valve seal 250 pressed against valve seat 258. Because the pressure in chambers 145 and 245 is the same, little force is required to open valve 257.

In FIG. 1P, opposite voltage potentials are applied across contacts 215 and 230. For example, with a negative voltage potential on contact 215, coated CNT mat 255 charges negatively and with a positive voltage potential applied to contact 230, conductive layer 110 charge positively thus electrostatically attracting coated CNT mat 155 toward the conductive layer, away from valve seat 258, opening valve 257.

The operation of the NO valve illustrated supra in reference to FIG. 1M operates in a similar manner except it is open with no voltage potentials applied top contacts 215 and 230 and closed when the same voltage potential polarity is applied to the contacts. Alternatively, a more positive valve actuation may be provided by forming an electrical connection 262 to conductive layer 175 and applying a voltage potential to conductive layer 175 opposite to that applied to contact 215.

Figure 2A:
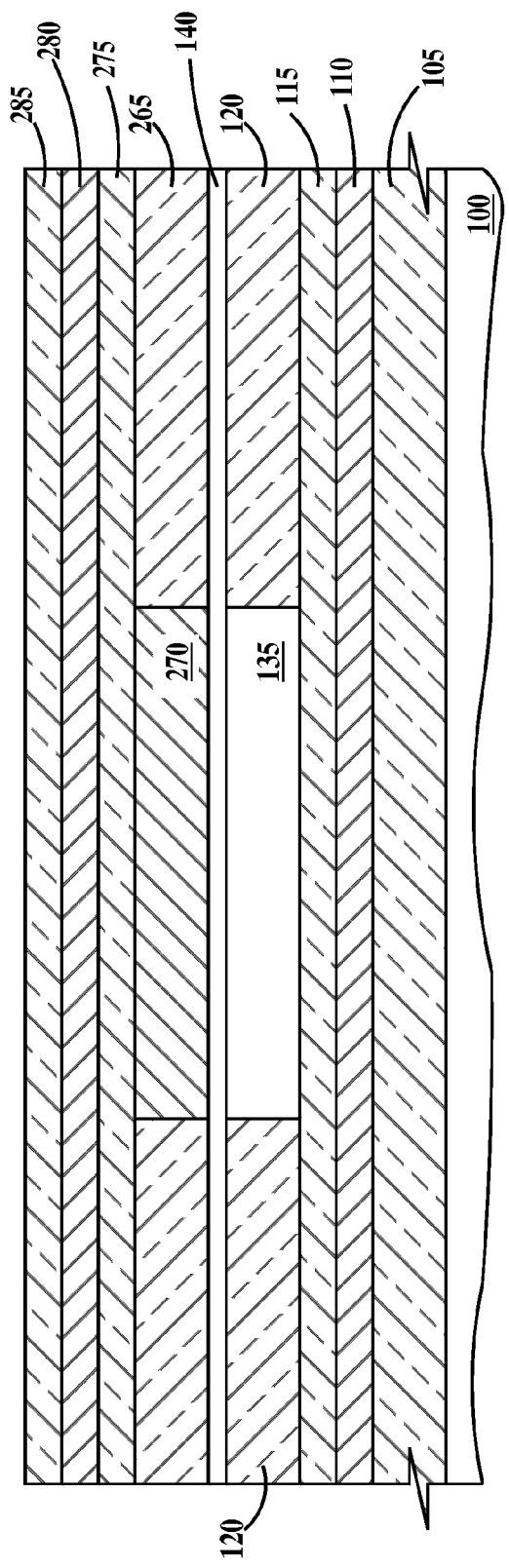
FIGS. 2A through 2E are cross-sectional drawings illustrating fabrication of the normally-open micro-valve according to a second embodiment of the present invention.

FIGS. 2A through 2E are cross-sectional drawings illustrating fabrication of the normally-open micro-valve according to a second embodiment of the present invention. FIG. 2A is similar to FIG. 1C except an insulating layer 265 is formed on CNT mat 140, a trench is formed in insulating layer 265 and over-filled with a sacrificial material, a CMP performed so that a top surface of a sacrificial fill 270 and a top surface of insulating layer 265 are coplanar, an insulating layer 275 is formed on top of insulating layer 265 and sacrificial fill 270, an electrically conductive layer 280 is formed on insulating layer 275 and an insulating layer 285 is formed on conductive layer 280. In one example, insulating layers 265, 275 and 285 independently comprise silicon dioxide, silicon nitride, quartz or polyimide. In one example, sacrificial fill 270 is germanium formed by LPCVD or PECVD. In one example, conductive layer 280 comprises copper, aluminum, aluminum-copper alloy, tungsten, tantalum, titanium, titanium nitride, tantalum nitride or combinations thereof.

Figure 2B:
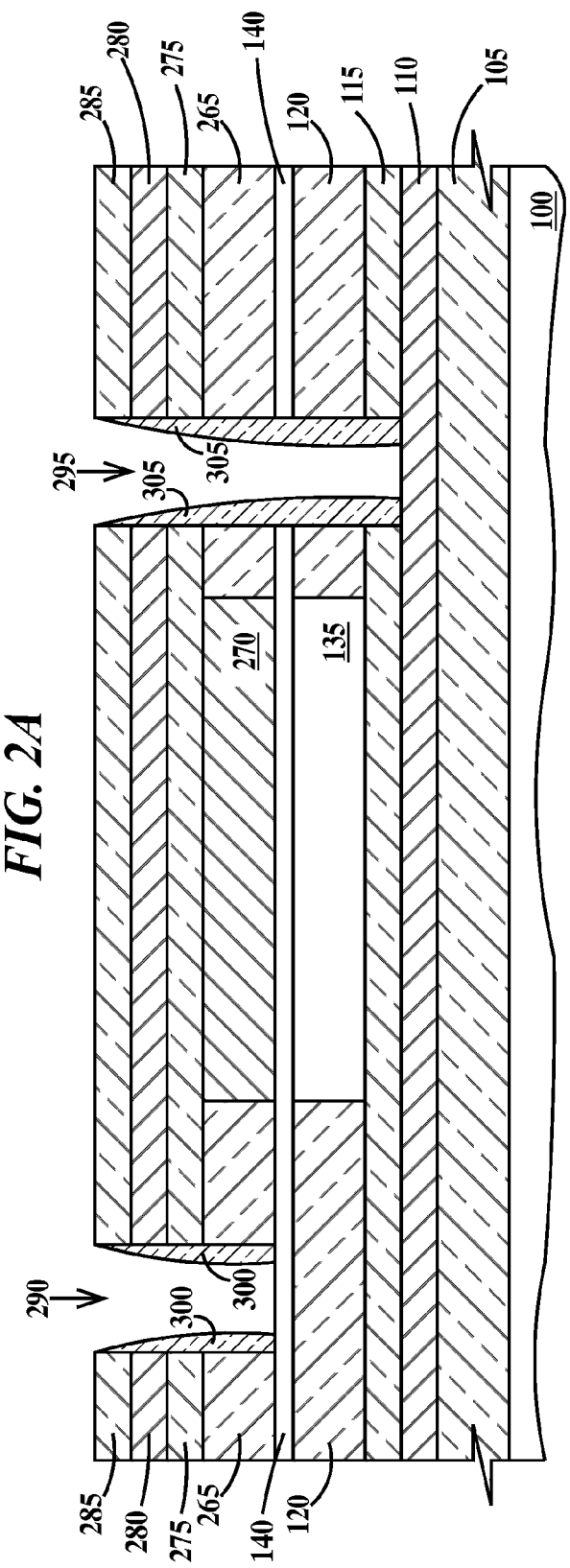

In FIG. 2B, trenches 290 and 295 are formed. Trench 290 extends though insulating layer 285, conductive layer 280, insulating layer 275 and insulating layer 265. CNT mat 140 is exposed in the bottom of trench 290. Trench 295 extends though insulating layer 285, conductive layer 280, insulating layer 275, insulating layer 265 and, mat 140, insulating layer 120 and insulating layer 115. Conductive layer 110 is exposed in the bottom of trench 195. In one example, trench 290 is formed and protected (for example by a layer of photoresist) and trench 295 then formed. In one example, trench 290 and a portion of trench 295 down to CNT mat 140 is formed and protected (for example by a layer of photoresist) and the remainder of trench 295 is formed. Formation of trenches 290 and 295 may be accomplished by photolithographic processes followed by RIE and removal of photoresist layers.

Additionally, spacers 300 are formed on the sidewalls of trench 290 and spacers 305 are formed (as described supra) on sidewalls of trench 285. In one example, spacers 300 and 305 comprise silicon nitride.

Figure 2C:
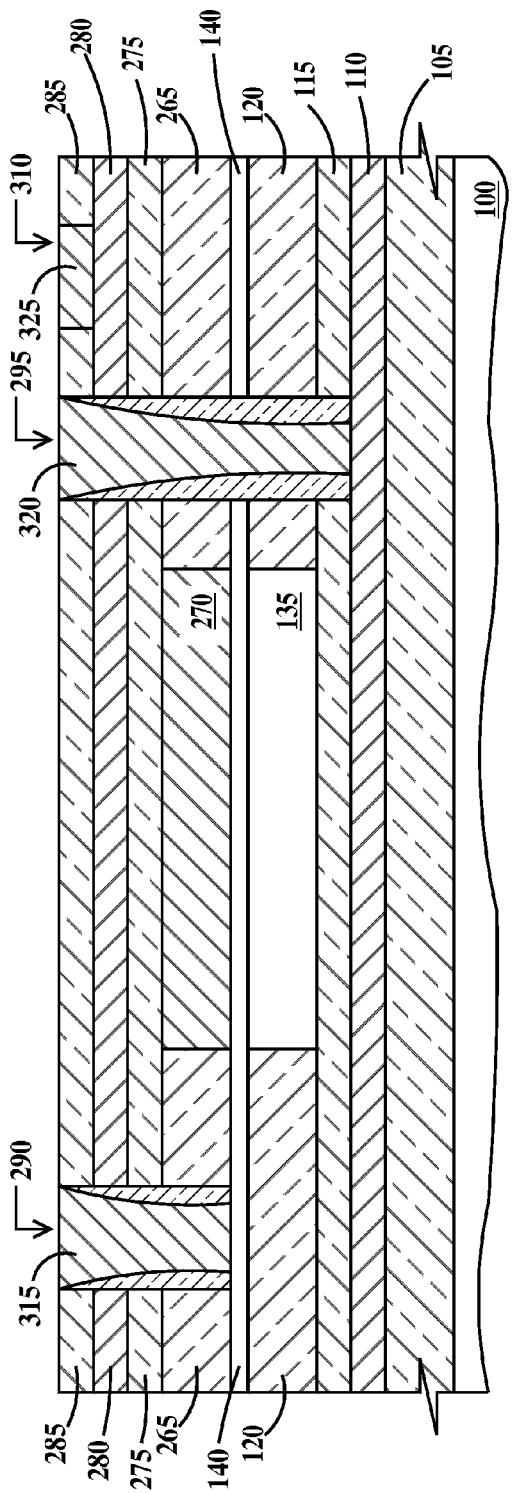

In FIG. 2C, a trench 310 is formed in insulating layer 285, exposing conductive layer 280 in the bottom of trench 310. Then a damascene process (as described supra) is performed to form electrically conductive contacts 310, 315 and 320. Contact 310 electrically contacts conductive layer 280, contact 315 electrically contacts CNT mat 140 and contact 320 electrically contacts conductive layer 110. In one example, contacts 310, 315 and 320 each comprise copper, aluminum, aluminum-copper alloy, tungsten, tantalum, titanium, titanium nitride, tantalum nitride or combinations thereof.

Figure 2D:
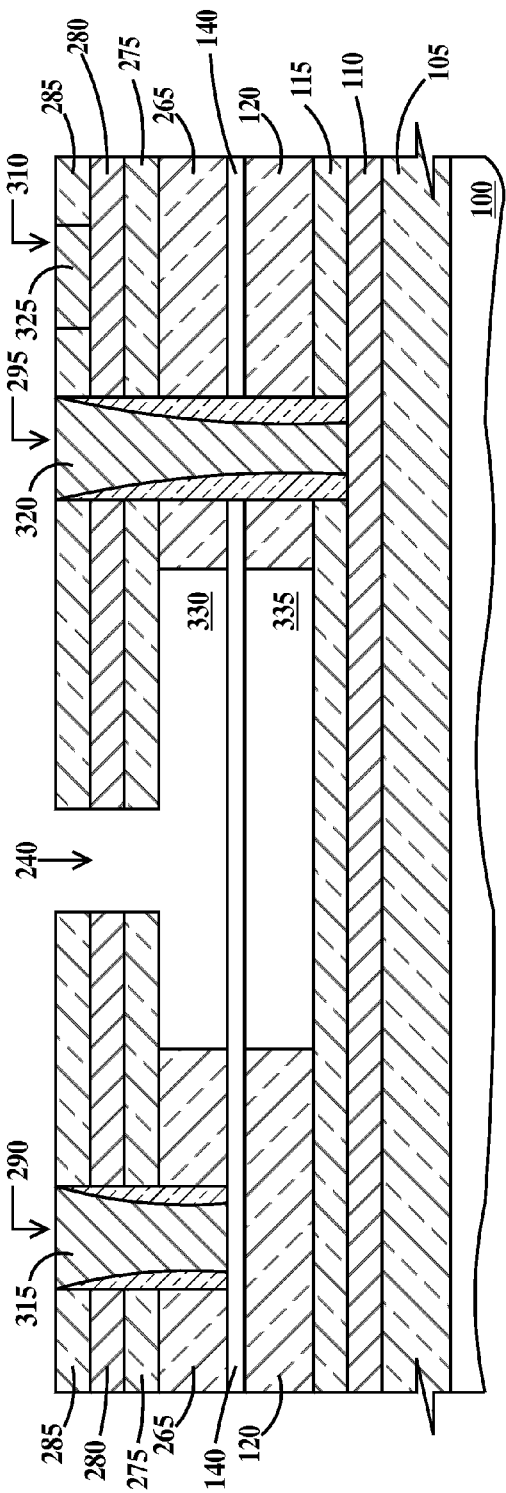

In FIG. 2D, trench 240 is formed through insulating layer 285, conductive layer 280 and insulating layer 275 to expose sacrificial fill 270 (see FIG. 2C). Then sacrificial fill 270 and sacrificial fill 135 (see FIG. 2C) are removed to form respective chambers 330 and 335 separated by CNT mat 140. If sacrificial fill 135 and sacrificial fill 270 are germanium, the sacrificial fills may be removed by etching with a solution of hydrogen peroxide.

Figure 2E:
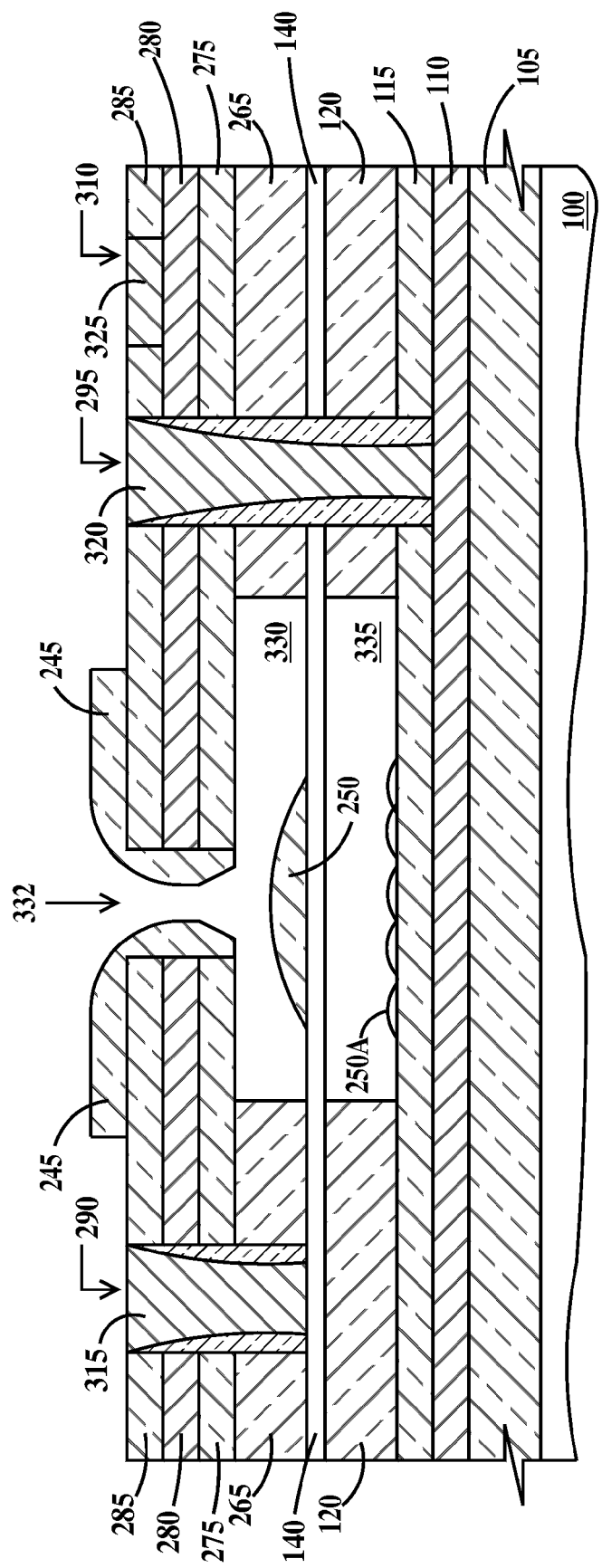

In FIG. 2E, valve seat 245 and valve seal 250 are simultaneously formed on the sidewalls of opening 240 (see FIG. 2D) and on a portion of CNT mat 140 directly under opening 240 as described supra in reference to FIG. 1M. Since valve seal 250 is formed through opening 240, valve seal 250 is self-aligned to opening 240 and to valve seat 245. Also, opening 240 becomes outlet 332. Since CNT mat 140 is porous, a small quantity of valve seat/valve seal material 250A may deposit on the bottom of chamber 335 under valve seal 250.

Figure 2F:
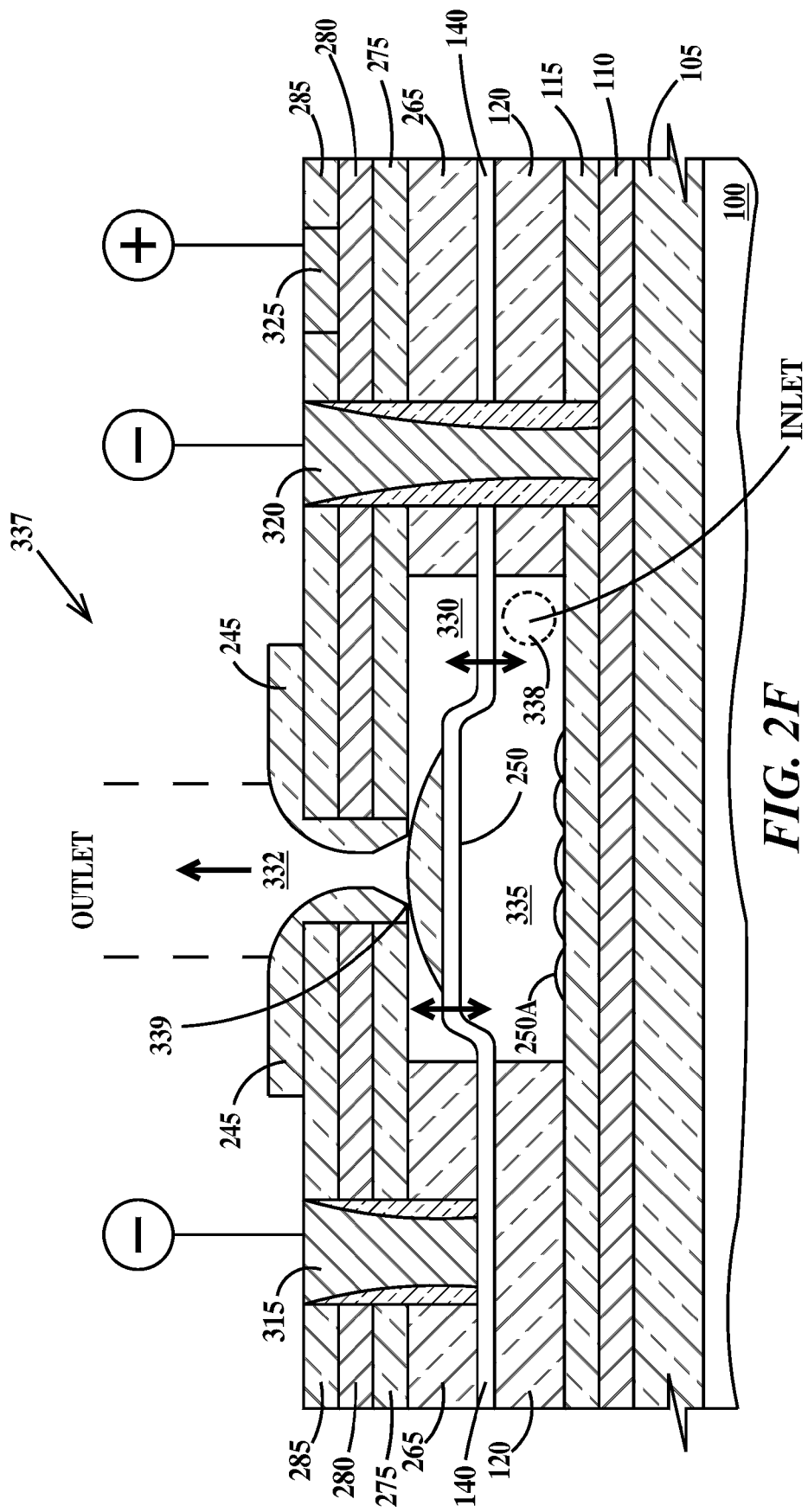
FIGS. 2F and 2G are cross-sectional drawings illustrating operation of the normally-open micro-valve according to a second embodiment of the present invention.
Figure 2G:
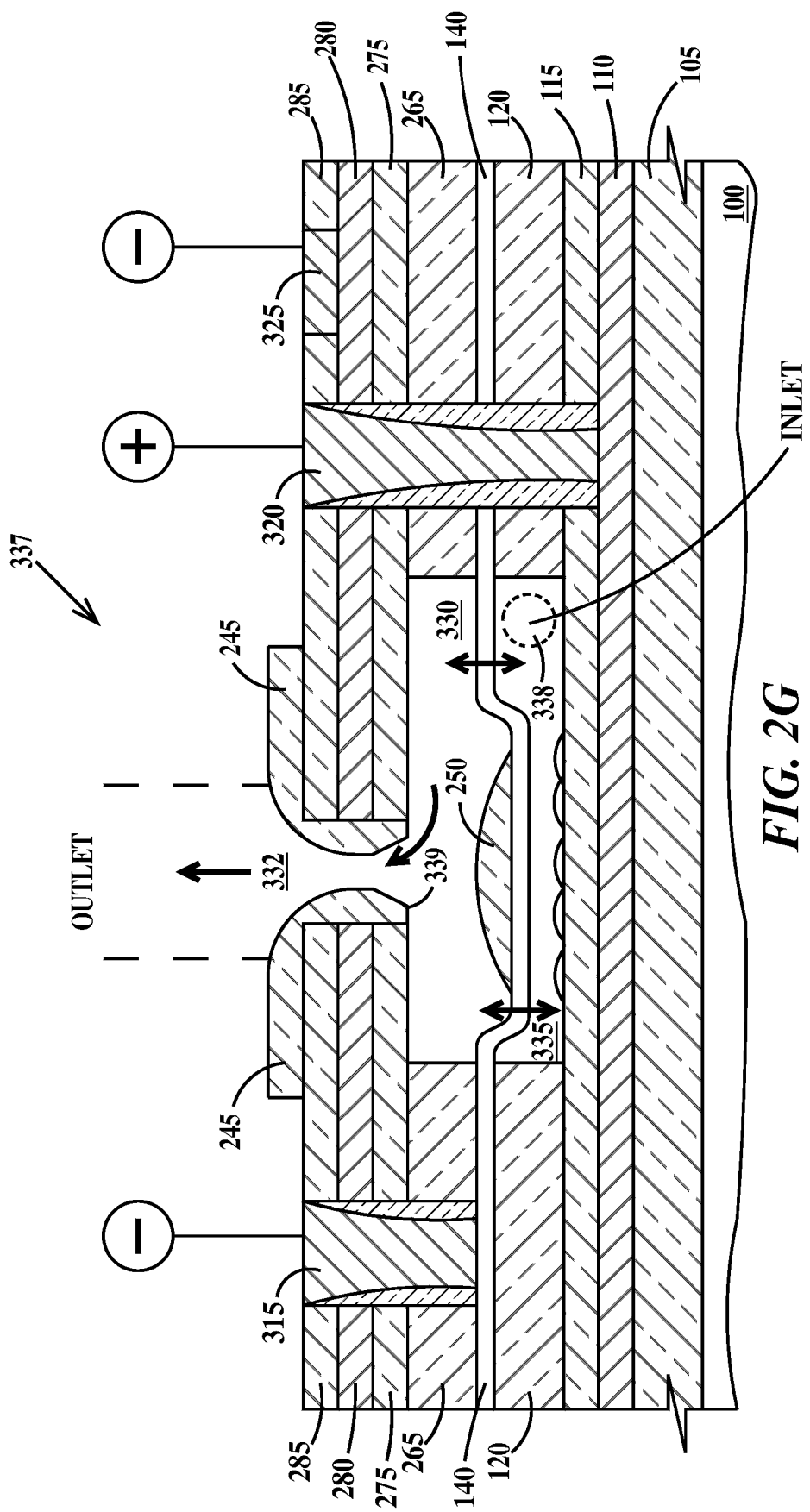

FIGS. 2F and 2G are cross-sectional drawings illustrating operation of the normally-open micro-valve according to a second embodiment of the present invention. In FIG. 2F, a NO valve 337 is shown in the closed position. There is no fluid transfer between an inlet 338 and outlet 332. A "generic" inlet is shown. Inlet 338 opens into chamber 335 and may be formed to enter from a bottom of chamber 335, a sidewall of chamber 335 or a top of chamber 335 if chamber 335 extends in a lateral direction (parallel to a top surface of substrate 100) further than chamber 330 extends in the lateral direction (i.e. when chamber 335 is longer or wider than chamber 330).

In FIG. 2F, with a negative voltage potential applied to contacts 315 and 320 and a positive voltage potential applied to contact 325, CNT mat 140 and conductive layer 110 charge negatively and conductive layer 280 charges positively. This electrostaticly attracts CNT mat 140 toward conductive layer 280 and electrostaticly repels CNT mat 140 from conductive layer 110, thus pressing valve seal 250 against edge 339 of valve seal 245 and closing valve 337. Because CNT mat 140 is porous, fluid from chamber 335 can pass into chamber 330 and fluid in chamber 330 can pass into chamber 355. The pressure of the fluid on the inlet side of NO valve 337 helps to keep valve seal 250 pressed against valve seat 245. Because the pressure in chambers 330 and 335 is the same, little force is required to close NO valve 337.

With no voltage potentials applied to contacts 315, 320 and 325, NO valve 337 is open and CNT mat 140 remains unflexed (see FIG. 2E). However, by reversing the voltage potential polarities on contacts 320 and 325 an enhanced open position of NO valve 337 may be obtained as illustrated in FIG. 2G.

In FIG. 2G, with a negative voltage potential applied to contacts 315 and 325 and a positive voltage potential applied to contact 320, CNT mat 140 and conductive layer 280 charge negatively and conductive layer 110 charges positively. This electrostaticly attracts CNT mat 140 toward conductive layer 110 and electrostaticly repels CNT mat 140 from conductive layer 280, thus pulling valve seal 250 away from edge 339 of valve seat 245 and enhancing the opening of NO valve 337. Because CNT mat 140 is porous, fluid from chamber 335 can pass into chamber 330 and fluid in chamber 330 can pass into chamber 355. Because the pressure in chambers 330 and 335 is the same, little force is required to open NO valve 337.

Figure 3D:
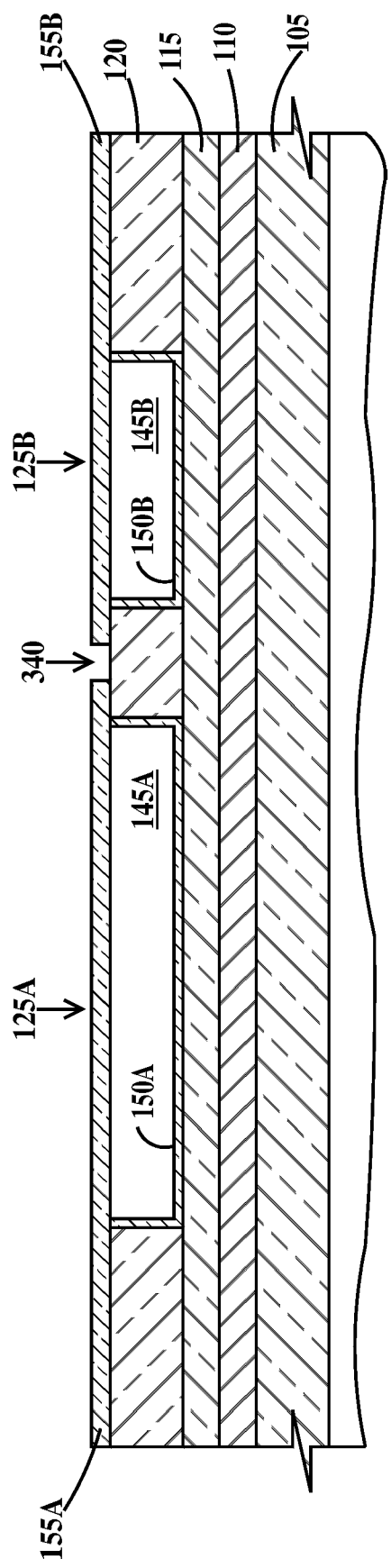

FIGS. 3A through 3G are cross-sectional drawings illustrating fabrication of a micro-pump according to a third embodiment of the present invention. FIGS. 3A and 3B are similar to FIGS. 1B and 1C except two trenches, trench 125A and 125B are formed in insulating layer 120 and filled with sacrificial fill 135A and 135B respectively. Top surfaces of sacrificial fill 135A and 135B and a top surface of insulating layer 120 are coplanar. In one example, sacrificial fills 135A and 135B comprise germanium. Trench 125A will become a part of one of two valves required for the micro-pump of the present invention and trench 125B will form a part of a pump section of the micro-pump. Fabrication of only one valve is illustrated in FIGS. 3A through 3G, fabrication of the second valve is identical to fabrication of the first valve.

In FIG. 3C, CNT mat 140 (see FIG. 3B) is cut into electrically isolated CNT mat 140A and CNT mat 140B, and sacrificial fills 135A and 135B (see FIG. 3B) are removed to form respective chambers 145A and 145B. If sacrificial fills 13A and 135B are germanium, sacrificial fills 135A and 135B may be removed by etching with a solution of hydrogen peroxide.

In FIG. 3D, a CNT mat 155A is porous and a CNT mat 155B is non-porous (e.g. impervious to the fluid that will be pumped or to a gas trapped in chamber 145B). In a first method, both CNT mat 140A and 140B (see FIG. 3C) are coated with a thickness of material sufficient to seal the voids between the CNTs and then all or a portion of the coating is removed from CNT mat 140A using, for example, an RIE process. In a second method, only CNT mat 140B is coated by using a photolithographic masking process. A thin layer 150A of coating material may be formed on the bottom and sidewalls of chamber 145A and a thin layer 150B of coating material may be formed on the bottom and sidewalls of chamber 145B. Suitable coating materials include dielectrics, metals and polymers that may be applied, for example, by sputter deposition, PECVD or ALD. In one example, the coating material is silicon nitride applied by PECVD or ALD.

Since CNT mat 155B is sealed, a gas or partial vacuum may be trapped in chamber 145B.

Figure 3E:
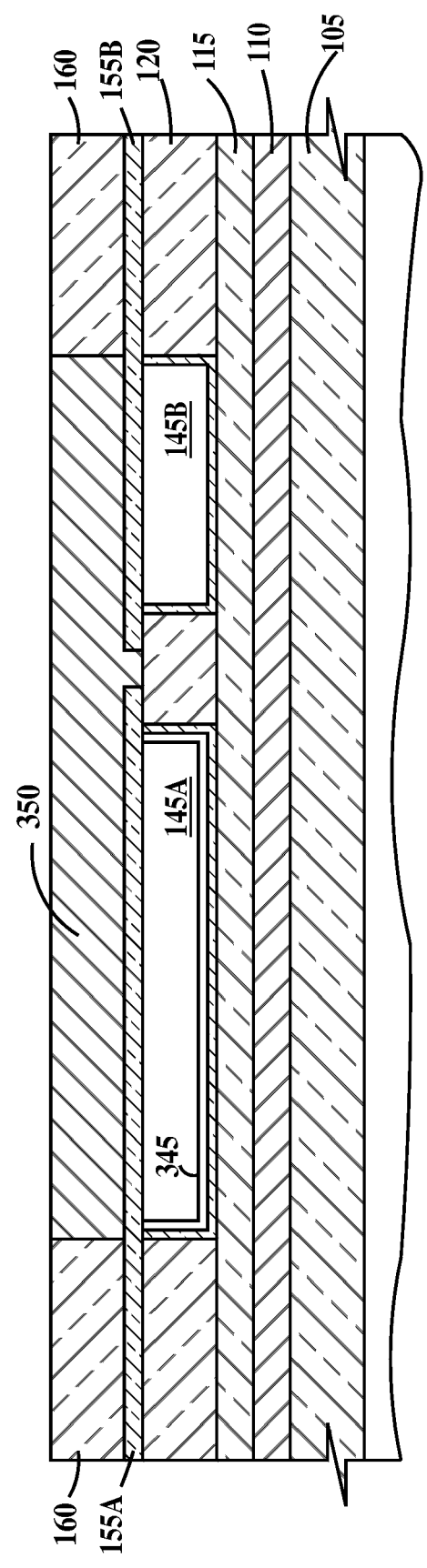

FIG. 3E is similar to FIG. 1E except, a trench is formed in insulating layer 160 and filled with a sacrificial fill 350 and sacrificial fill 350 extends over both chamber 145A and 145B (as well as a second valve chamber 145C not shown in FIG. 3E). A top surface of sacrificial fill 350 and a top surface of insulating layer 160 are coplanar. A thin layer 345 of fill material may be formed in chamber 145A.

Figure 3F:
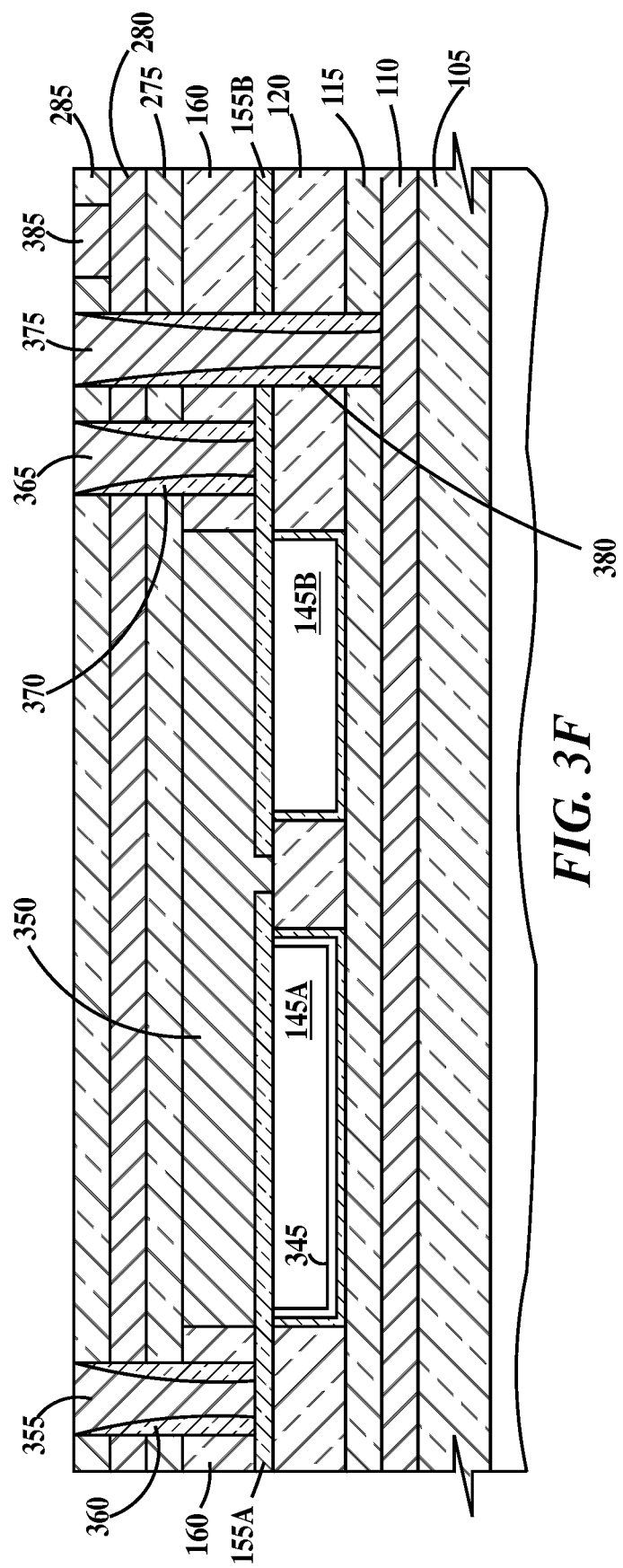

In FIG. 3F, insulating layer 275 is formed on top of insulating layer 160 and sacrificial fill 350, electrically conductive layer 280 is formed on insulating layer 275 and insulating layer 285 is formed on conductive layer 280. Insulating layers 275 and 285 and conductive layer 280 have been described supra. A damascene contact 355 is formed to electrically contact CNT mat 155A. A dielectric spacer 360 (in one example silicon nitride) electrically isolates contact 355 from conductive layer 280. A damascene contact 365 is formed to electrically contact CNT mat 155B. A dielectric spacer 370 (in one example silicon nitride) electrically isolates contact 365 from conductive layer 280. A damascene contact 375 is formed to electrically contact conductive layer 110. A dielectric spacer 380 (in one example silicon nitride) electrically isolates contact 375 from conductive layer 280 and CNT mat 155B. A damascene contact 385 is formed to electrically contact conductive layer 280. In one example, contacts 355, 365, 375 and 385 each comprise copper, aluminum, aluminum-copper alloy, tungsten, tantalum, titanium, titanium nitride, tantalum nitride or combinations thereof.

Figure 3G:
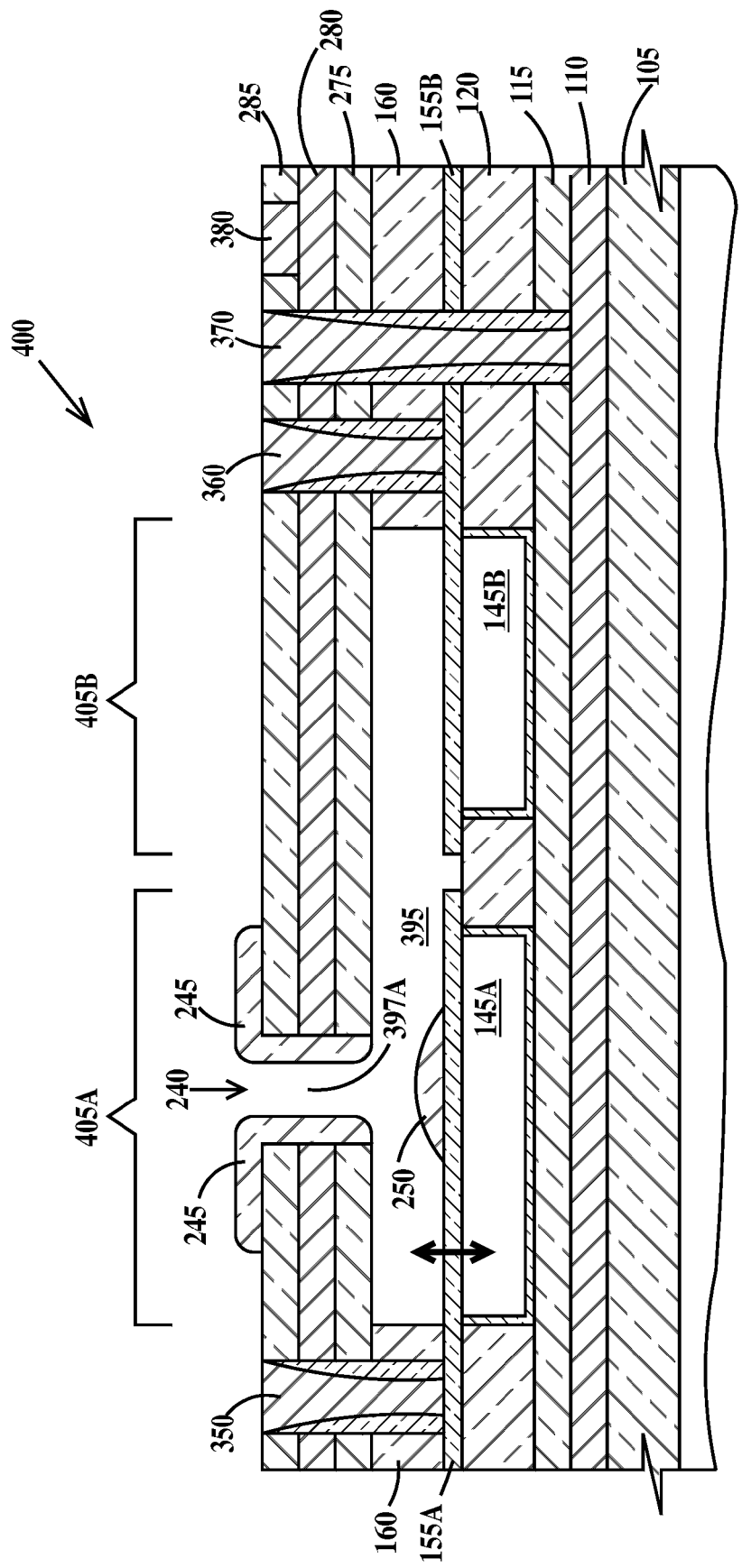

In FIG. 3G, opening 240 is formed through insulating layer 285, conductive layer 280 and insulating layer 275 to expose sacrificial fill 350 (see FIG. 3F) and then sacrificial fill material is removed to form a chamber 395. Opening 240 is formed over chamber 145A. If sacrificial fill 350 is germanium, the sacrificial fill may be removed by etching with a solution of hydrogen peroxide. Then valve seat 245 and valve seal 250 are simultaneously formed on the sidewalls of opening 240 to form an inlet/outlet 397 and on a portion of CNT mat 155A directly under opening 240 as described supra in reference to FIG. 1M. Since valve seal 250 is formed through opening 240, valve seal 250 is self-aligned to opening 240 and valve seat 245.

In FIG. 3G, a micro-pump 400 includes a first valve 405A, a pump 405B and a second valve 405C (not shown) identical to first valve 405A and having a corresponding chamber 145C (not shown, see FIG. 4) and CNT mat 155C (not shown) having a corresponding contact 350A (not shown). CNT mats 155A, 155B and 155C (not shown) are electrically isolated from each other. First valve 405A comprises, opening 240, valve seat 245, valve seal 250, porous CNT mat 155A, chamber 145A and chamber 395. Pump 405B comprises a chamber 395, coated and non-porous CNT mat 155B and chamber 145B. Second valve 405C (not shown) comprises, an opening 240C (not shown), a valve seat 245C (not shown), a valve seal 250C (not shown), a porous CNT mat 155C (not shown), a chamber 145C (not shown), and chamber 395. First valve 405A may serve as an outlet of micro-pump 400 and second valve 405C (not shown) may serve as an inlet of micro-pump 400.

While NO valves have been shown in micro-pump 400 (see FIG. 3G) NC valves as described supra, may be substituted.

FIG. 4 is a top view of the valve and pump chambers of the micro-pump according to the third embodiment of the present invention. In FIG. 4, insulating layer 120 having chamber 145A of first valve 405A, chamber 145B of pump 405B and chamber 145C of second valve 405C is illustrated. Line 3G-3G indicates the section through which FIG. 3G (as well as FIGS. 3A through 3F were taken).

FIGS. 5A through 5D are schematic drawings illustrating operation of the micro-pump according to the third embodiment of the present invention. In FIG. 5A, chamber 145A is separated from chamber 395 by CNT mat 155A, chamber 145B is separated from chamber 395 by CNT mat 155B and chamber 145C is separated from chamber 395 by CNT mat 155C. Chamber 395 includes an outlet 397A aligned over CNT mat 155A and an inlet 397C aligned over CNT mat 155C. Valve seals and seats are not shown, but are present as described supra and illustrated in FIG. 3G. Electrical connections to conductive layers 110, 280, CNT mats 155A, 155B and 155C are also shown. In FIG. 5A no voltage potentials are applied to any of the electrical connections.

In FIG. 5B, negative potential voltages are applied to conductive layer 280, CNT mats 155B and 155C, and positive voltage potentials are applied to conductive layer 110 and CNT mat 155A. CNT mat 155A is electrostatically attracted to conductive layer 280 and electrostatically repelled from conductive layer 110, closing outlet 397A. CNT mats 155B and 155C electrostatically attracted to conductive layer 110 and electrostatically repelled from conductive layer 280, further opening inlet 397C and pulling the fluid to be pumped into chamber 395.

In FIG. 5C, negative potential voltages are applied to conductive layer 280 and CNT mat 155B and positive voltage potentials are applied to conductive layer 110 and CNT mats 155A and 155C. CNT mat 155A remains electrostatically attracted to conductive layer 280 and electrostatically repelled from conductive layer 110, maintaining the closure of outlet 397A. CNT mat 155C is electrostatically attracted to conductive layer 280 and electrostatically repelled from conductive layer 110, closing inlet 397C. CNT mat 155B remains electrostatically attracted to conductive layer 110 and electrostatically repelled from conductive layer 280 trapping the fluid to be pumped in chamber 395.

In FIG. 5D, negative potential voltages are applied to conductive layer 280 and CNT mat 155A, and positive voltage potentials are applied to conductive layer 110 and CNT mats 155B and 155C. CNT mat 155C remains electrostatically attracted to conductive layer 280 and electrostatically repelled from conductive layer 110, maintaining the closure of inlet 397C. CNT mat 155A is electrostatically attracted to conductive layer 110 and electrostatically repelled from conductive layer 280, opening outlet 397A. CNT mat 155B is electrostatically attracted to conductive layer 280 and electrostatically repelled from conductive layer 110, thereby compressing the fluid to be pumped in chamber 395 and expelling fluid from chamber 395 through outlet 397A.

The sequence of voltage potential applications shown in FIGS. 5B through 5D is repeated as the micro-pump operates. Enhanced operation of the micro-pump my be accomplished by splitting conductive layers 110 into three section and 280 into three sections, each pair of sections aligned to one of chambers 145A, 145B and 145C and timing the application of voltage potentials to each of the three pairs of sections.

FIG. 6 is a top view of the valve and pump chambers of a micro-pump according to a fourth embodiment of the present invention. In the fourth embodiment of the present invention two pumps according to the third embodiment of the present invention are arranged in parallel. In FIG. 6, formed in insulating layer 120 is a chamber 145A1 of a first valve, a chamber 145C1 of a second valve, a first pump chamber 145B1, a chamber 145A2 of a third valve, a chamber 145C2 of a fourth valve and a second pump chamber 145B2. An opening 410 between first and second pump chambers 145B1 and 145B2 allow the gas trapped in the first and second pump chambers to freely pass between the pump chambers. Individual CNTs mats (not shown), each electrically isolated from each other and connected to a different contact (not shown) separate chambers 145A1 145B1 and 145C1 from a first common chamber (not shown) formed over chambers 145A1 145B1 and 145C1 as described supra. Individual CNTs mats (not shown), each electrically isolated from each other and connected to a different contact (not shown) separate chambers 145A2, 145B2 and 145C2 from a second common chamber (not shown) formed over chambers 145A2, 145B2 and 145C2 as described supra. The first and second common chambers are not connected to each other and the fluid to be pumped cannot pass between the two common chambers.

FIG. 7 is a top view of the valve and pump chambers of a micro-pump according to a fifth embodiment of the present invention. FIG. 7 is similar to FIG. 6, except third and fourth chambers 145A2 and 145C2 (see FIG. 6) are not present and the CNT mat (not shown) over first pump chamber 145B1 is electrically isolated and not connected to a voltage potential source. This pump arrangement is suitable for pumping conductive fluids as described infra.

While two pumps in parallel have been illustrated in FIGS. 6 and 7, it will be appreciated that any number of pumps may be connected in parallel. Pumps according to the present invention may also be connected in series by forming conduits in additional layers of materials formed above the pumps and connecting the inlet of one pump to the outlet of another pump.

FIGS. 8A through 8C are schematic drawings illustrating operation of the micro-pump according to the fourth embodiment of the present invention. In FIG. 8A, pump chamber 145B1 is separated from common chamber 395A by CNT mat 155B1 (the first and second valve chambers are not illustrated, but "share" common chamber 395A and pump chamber 145B2 is separated from common chamber 395B by CNT mat 155B2 (the third and fourth valve chambers are not illustrated, but "share" common chamber 395B. Electrical connections to conductive layers 110, 280 and CNT mats 155B1 and 155B2 are also shown. Connections to the CNT mats of the four valves are not shown. In FIG. 8A no voltage potentials are applied to any of the electrical connections.

In FIGS. 8B and 8C, only the operation of the pump CNT mats 155B1 and 155B2 will be described. In FIG. 8B, negative potential voltage is applied to conductive layer 280 and CNT mat 155B1 and positive voltage potentials are applied to conductive layer 110 and CNT mat 155B2. CNT mat 155B1 is electrostatically attracted to conductive layer 110 and electrostatically repelled from conductive layer 280 pulling the fluid being pumped into chamber 395A. CNT mat 155B2 is electrostatically repelled from conductive layer 110 and electrostatically attracted to conductive layer 280 pushing the fluid being pumped out of chamber 395B. A portion of the gas trapped in chamber 145B1 is transferred from chamber 145B1 to 145B2.

In FIG. 8C, negative potential voltage is applied to conductive layer 280 and CNT mat 155B2 and positive voltage potentials are applied to conductive layer 110 and CNT mat 155B1. CNT mat 155B1 is electrostatically attracted to conductive layer 280 and electrostatically repelled from conductive layer 110 pushing the fluid being pumped out of chamber 395A. CNT mat 155B2 is electrostatically repelled from conductive layer 280 and electrostatically attracted to conductive layer 110 pulling the fluid being pumped into of chamber 395B. A portion of the gas trapped in chamber 145B2 is transferred from chamber 145B2 to 145B1

The sequence of voltage potential applications shown in FIGS. 8B and 8C is repeated as the pump operates. The transfer of gas between chambers 145B1 and 145B2 smoothes the operation of the pump. Enhanced operation of the micro-pump my be accomplished by splitting conductive layers 110 into two sections and 280 into two sections, each pair of sections aligned to one of chambers 145B1 and 145B2 and timing the application of voltage potentials to each of the two pairs of sections.

The operation of the pump illustrated in FIG. 7 (fifth embodiment) is similar to that described for the pump of FIG. 6 (fourth embodiment) supra, except there is no electrical connection to CNT mat 155B1 and flexure of CNT mat 155B1 is caused by gas transfer between chambers 145B1 and 145B2. Since no conductive fluid that could interfere with the electrostatic flexing of CNT mat 155B2 is present in chambers 145B2 and 395B, the fifth embodiment of the present invention may be advantageously used to pump conductive fluids. However valves 397A and 397C must be NC valves and chambers 145A and 145C must be connected by a passage to relive back-pressure. Also a voltage connection to layer 280 is not required.

Thus, the various embodiments of the present invention provide micro-electro-mechanical valves and pumps and methods of fabricating micro-electro-mechanical valves and pumps.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method of fabricating a micro-valve having an inlet and an outlet, said method comprising:

on a substrate, forming a lower chamber having a bottom wall and sidewalls and forming an upper chamber having a top wall and sidewalls, a bottom of said upper chamber separated from a top of said lower chamber by a porous, flexible and electrically conductive mat of nano-fibers;

forming an opening in said top wall of said upper chamber;

forming an impervious valve seal on said mat of nano-fibers, said valve seat below and self-aligned to said opening;

forming a first electrically conductive plate above said top wall of said upper chamber and a second electrically conductive plate under said bottom wall of said lower chamber;

forming a first electrical contact to said first conductive plate;

forming a second electrical contact to said second conductive plate;

forming a third electrical contact to said mat of nano-fibers;

wherein said first conductive plate is formed on a insulating layer formed on a substrate;

wherein said forming said lower chamber includes forming a first trench in a first dielectric layer formed on said first conductive plate, filling said trench with a first sacrificial material and forming said porous mat of nano-fibers over said first sacrificial material followed by removing said first sacrificial material; and wherein said forming said upper chamber includes forming a trench in a second dielectric layer formed on said mat of nano-fibers, filling said second trench with a second sacrificial material, forming a third dielectric layer on said second dielectric layer and said second sacrificial material, forming an opening though said third dielectric layer to said second sacrificial material and removing said second sacrificial material.

2. The method of claim 1, wherein said outlet comprises said opening in said top wall of said upper chamber and said inlet comprises an additional opening in said top wall of said upper chamber.

3. The method of claim 1, wherein a valve seat defined is by an edge of said opening along an interior surface of said top wall of said upper chamber.

4. The method of claim 1, further including:

forming a valve seat on sidewalls of said opening.

5. The method of claim 1, further including:

forming a protective coating on nano-fibers of said mat of nano-fibers.

6. The method of claim 1, wherein said micro-fibers are silicon filaments or carbon nanotubes.

7. A method of fabricating a micro-valve having an inlet and an outlet, said method comprising:

on a substrate, forming a lower chamber having a bottom wall and sidewalls and forming an upper chamber having a top wall and sidewalls, a bottom of said upper chamber separated from a top of said lower chamber by a porous, flexible and electrically conductive mat of nano-fibers;

forming an opening in said top wall of said upper chamber;

forming an impervious valve seal on said mat of nano-fibers, said valve seat below and self-aligned to said opening;

forming a first electrically conductive plate above said top wall of said upper chamber and a second electrically conductive plate under said bottom wall of said lower chamber;

forming a first electrical contact to said first conductive plate;

forming a second electrical contact to said second conductive plate;

forming a third electrical contact to said mat of nano-fibers;

wherein a region of said top wall of said upper chamber adjacent to said opening is thicker than a region of said top wall of said upper chamber away from said opening;

wherein said first conductive plate is formed on a insulating layer formed on a substrate;

wherein said forming said lower chamber includes forming a first trench in a first dielectric layer formed on said first conductive plate, filling said trench with a first sacrificial material and forming said porous mat of nano-fibers over said first sacrificial material followed by removing said first sacrificial material;

wherein said forming said upper chamber includes forming a second trench in a second dielectric layer formed on said mat of nano-fibers, filling said second trench with a second sacrificial material, forming a first silicon nitride layer on said second dielectric layer and said second sacrificial material, forming a polysilicon layer on said first silicon nitride layer, forming a second silicon nitride layer on said polysilicon layer and forming an opening though said second silicon nitride layer, said polysilicon layer and said second silicon nitride layer to said second sacrificial material and removing said second sacrificial material; and performing a thermal oxidation, said thermal oxidation converting a region of said polysilicon layer adjacent to said opening to silicon dioxide and pushing a region of said first silicon nitride layer adjacent to said opening toward said mat of nano-fibers.

8. The method of claim 7, wherein said outlet comprises said opening in said top wall of said upper chamber and said inlet comprises an additional opening in said top wall of said upper chamber.

9. The method of claim 7, wherein a valve seat is defined by an edge of said opening along an interior surface of said top wall of said upper chamber.

10. The method of claim 7, further including:
forming a protective coating on nano-fibers of said mat of nano-fibers.

11. The method of claim 7, wherein said micro-fibers are silicon filaments or carbon nanotubes.

12. A method of fabricating a micro-valve having an inlet and an outlet, said method comprising:

on a substrate, forming a lower chamber having a bottom wall and sidewalls and forming an upper chamber having a top wall and sidewalls, a bottom of said upper chamber separated from a top of said lower chamber by a porous, flexible and electrically conductive mat of nano-fibers;

forming an opening in said top wall of said upper chamber;

forming an impervious valve seal on said mat of nano-fibers, said valve seat below and self-aligned to said opening;

forming a first electrically conductive plate above said top wall of said upper chamber and a second electrically conductive plate under said bottom wall of said lower chamber;

forming a first electrical contact to said first conductive plate;

forming a second electrical contact to said second conductive plate;

forming a third electrical contact to said mat of nano-fibers;

forming an additional conductive plate on top of said upper chamber;

forming a third electrical contact to said additional conductive plate;

forming an additional opening into said bottom chamber, said inlet comprised of said additional opening and said outlet comprised of said opening;

wherein said first conductive plate is formed on a insulating layer formed on a substrate;

wherein said forming said lower chamber includes forming a first trench in a first dielectric layer formed on said first conductive plate, filling said first trench with a first sacrificial material and forming said porous mat of nano-fibers over said first sacrificial material followed by removing said first sacrificial material; and wherein said forming said upper chamber includes forming a second trench in a second dielectric layer formed on said mat of nano-fibers, filling said second trench with a second sacrificial material, forming a third dielectric layer on said second dielectric layer and said second sacrificial material, forming a second conductive layer on said third dielectric, forming a fourth dielectric layer on said second conductive layer and forming an opening though said fourth dielectric layer, said second conductive layer and said third dielectric layer to said second sacrificial material and removing said second sacrificial material.

13. The method of claim 12, further including:
forming a protective coating on nano-fibers of said mat of nano-fibers.

14. The method of claim 12, wherein said micro-fibers are silicon filaments or carbon nanotubes.

* * * * *